(12) United States Patent
Kashiyama et al.

(10) Patent No.: US 8,095,690 B2
(45) Date of Patent: Jan. 10, 2012

(54) MACHINE-READABLE MEDIUM FOR STORING A STREAM DATA PROCESSING PROGRAM AND COMPUTER SYSTEM

(75) Inventors: Toshihiko Kashiyama, Kokubunji (JP); Itaru Nishizawa, Koganei (JP); Tsuneyuki Imaki, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 268 days.

(21) Appl. No.: 12/606,641

(22) Filed: Oct. 27, 2009

(65) Prior Publication Data

US 2010/0106853 A1  Apr. 29, 2010

(30) Foreign Application Priority Data

Oct. 28, 2008  (JP) .................. 2008-276685

(51) Int. Cl.
*G06F 3/00* (2006.01)
*G06F 7/00* (2006.01)
*G06Q 10/00* (2006.01)
(52) U.S. Cl. ............... 710/1; 707/705; 705/1.1
(58) Field of Classification Search .............. None
See application file for complete search history.

(56) References Cited

U.S. PATENT DOCUMENTS

| | | | |
|---|---|---|---|
| 5,495,600 A | 2/1996 | Terry et al. | |
| 2008/0072221 A1 | 3/2008 | Chkodrov et al. | |
| 2010/0034515 A1* | 2/2010 | Asai ........................ | 386/95 |

OTHER PUBLICATIONS

Rajeev Motwani, et al.; Query Processing, Approximation, and Resource Management in a Data Stream Management System; In Proc. Of the 2003 Conf., pp. 1-12; http://www-db.stanford.edu/stream.
C. J., An Overview of SQL; Addison-Wesley, 1986; pp. 8-26.
Yijian Bai et al.; Optimizing Timestamp Management in Data Stream Management Systems; IEEE 23$^{rd}$ International Conference on Data Engineering 2007; bai@cs.ucla.edu.
U.S Appl. No. 12/230,289.
U.S Appl. No. 12/542,887.
C. J. Date et al., "A Guide to SQL Standard (4th Edition)", the United States, Addison-Wesley Professional, Nov. 8, 1996.

* cited by examiner

*Primary Examiner* — Alan Chen
(74) *Attorney, Agent, or Firm* — Antonelli, Terry, Stout & Kraus, LLP.

(57) ABSTRACT

In a stream data processing method in which part of stream data is defined as a processing target and the time control information which indicates the advance of the time is inserted into the stream data, time information of the received stream data is stored in a next ignition time holding area as an ignition time. A processing module for generating the time control information at a time different from the time of reception of the stream data is extracted out of a query that indicates how the stream data is to be processed. Based on the extracted processing module and the time information indicating the time of the reception of the stream data, the ignition time is calculated and stored in the next ignition time holding area. The time generation module inserts the time control information at the ignition time held in the next ignition time holding area.

13 Claims, 18 Drawing Sheets

TEMPERATURE STREAM DATA (S1)21₁

HUMIDITY STREAM DATA (S2)21₂

STREAM REGISTRATION COMMAND                                    401

REGISTER STREAM TEMPERATURE STREAM (TEMPERATURE SENSOR ID INT,
DEVICE ID INT, TEMPERATURE DOUBLE) ;

402

REGISTER STREAM HUMIDITY STREAM (HUMIDITY SENSOR ID INT,
DEVICE ID INT, HUMIDITY DOUBLE) ;

*FIG. 4*

QUERY REGISTRATION COMMAND

```
register query Q1 as
ISTREAM ( SELECT S1. DEVICE ID, Avg(S1. TEMPERATURE), Avg(S2. HUMIDITY)
FROM TEMPERATURE STREAM [Range 2 minutes] As S1,
HUMIDITY STREAM [Partition by S1. HUMIDITY SENSOR ID rows 1] As S2
WHERE S1. TEMPERATURE SENSOR ID=S2. HUMIDITY SENSOR ID and S1. TEMPERATURE >=20 and S2. HUMIDITY >=60
GROUP BY S1. DEVICE ID)<1 minute>;
```
⎿ 501

```
register query Q2 as
RSTREAM[5 minutes] ( SELECT S1. DEVICE ID, Avg(S1. TEMPERATURE), Avg(S2. HUMIDITY)
FROM TEMPERATURE STREAM [Jumping 10 minutes] As S1,
HUMIDITY STREAM [Partition by S1. HUMIDITY SENSOR ID rows 1] As S2
WHERE S1. TEMPERATURE SENSOR ID=S2. HUMIDITY SENSOR ID and S1. TEMPERATURE >=20 and S2. HUMIDITY >=60
GROUP BY S1. DEVICE ID);
```
⎿ 502

FIG. 5

QUERY EXECUTION TREE ANALYSIS RESULT MANAGEMENT TABLE 235

| TARGET OPERATOR 701 | SETTING ITEM 702 | LAST EXECUTION TIME 703 |
|---|---|---|
| WINDOW OPERATOR 611 (RANGE WINDOW) | SLIDING WINDOW SIZE = 2 MINUTES | — |
| AGGREGATION OPERATOR 616 (WITH GHOST EXCLUDED, SUM) | MINIMUM TIME UNIT | — |
| STREAMING OPERATOR 617 (DELAY SPECIFIED, ISTREAM) | DELAY SIZE = 1 MINUTE | — |
| WINDOW OPERATOR xxx (JUMPING WINDOW) | JUMPING WINDOW SIZE = 10 MINUTES | 9:03 |
| STREAMING OPERATOR yyy (RSTREAM) | OUTPUT INTERVAL = 5 MINUTES | 9:00 |
| ... | ... | ... |

MACHINE-READABLE MEDIUM FOR STORING A STREAM DATA PROCESSING PROGRAM AND COMPUTER SYSTEM

CLAIM OF PRIORITY

The present application claims priority from Japanese patent application JP2008-276685 filed on Oct. 28, 2008, the content of which is hereby incorporated by reference into this application.

BACKGROUND OF THE INVENTION

This invention relates to a method of, in a stream data processing system, generating time control information inside the system and between the systems.

There has been an increasing demand for a data processing system which carries out real-time processing for data continuously arriving at a database management system (hereafter, referred to as "DBMS"), which carries out processes for data stored in the storage system.

Data which continuously arrives is defined as stream data, and there has been proposed a stream data processing system as a data processing system suitable for the real-time processing for the stream data. For example, R. Motwani, J. Widom, A. Arasu, B. Babcock, S. Babu, M. Datar, G. Manku, C. Olston, J. Rosenstein, and R. Varma: "Query Processing, Approximation, and Resource Management in a Data Stream Management System", In Proc. of the 2003 Conf. on Innovative Data Systems Research (CIDR), (online), January 2003, (retrieved on Oct. 15, 2008), discloses a stream data processing system "STREAM".

In the stream data processing system, first, queries are registered to the system, and the queries are executed continuously each time data arrives, which is different from the conventional DBMS. The above-mentioned STREAM employs an idea referred to as sliding window, which partially cuts stream data for efficiently processing the stream data to thereby impart lifetime to the data. As a preferred example of a query description language including a sliding window specification, there is a continuous query language (CQL) disclosed in R. Motwani, J. Widom, A. Arasu, B. Babcock, S. Babu, M. Datar, G. Manku, C. Olston, J. Rosenstein, and R. Varma: "Query Processing, Approximation, and Resource Management in a Data Stream Management System", In Proc. of the 2003 Conf. on Innovative Data Systems Research (CIDR), (online), January 2003, (retrieved on Oct. 15, 2008). The CQL includes an extension for specifying the sliding window by using parentheses following a stream name in a FROM clause of a structured query language (SQL), which is widely used for the DBMS.

As for SQL, there is known one disclosed in C. J. Date, Hugh Darwen: "A Guide to SQL Standard (4th Edition)", the United States, Addison-Wesley Professional, Nov. 8, 1996, ISBN: 021964260. There are two types of typical methods for specifying the sliding window: (1) a method of specifying the number of data rows to be cut, and (2) a method of specifying a time interval containing data rows to be cut. For example, "Rows 50 Preceding" described in a second paragraph of R. Motwani, J. Widom, A. Arasu, B. Babcock, S. Babu, M. Datar, G. Manku, C. Olston, J. Rosenstein, and R. Varma: "Query Processing, Approximation, and Resource Management in a Data Stream Management System", In Proc. of the 2003 Conf. on Innovative Data Systems Research (CIDR), (online), January 2003, (retrieved on Oct. 15, 2008), is a preferred example of the item (1), in which data corresponding to 50 rows is cut to be processed, and "Range 15 Minutes Preceding" is a preferred example of the item (2), in which data for 15 minutes is cut to be processed. In the case of the item (1), the data lifetime is defined to be until 50 pieces of data arrive. In the case of the item (2), the data lifetime is defined to be 15 minutes. The stream data cut by the sliding window is held on a memory, and is used for the query processing.

In the stream data processing, event extraction through an analysis in which a plurality of data sources are combined, the extraction of events that have occurred within a given period of time, or other similar processing requires a heartbeat tuple (hereinafter abbreviated as HBT) to be generated and processed regularly within a data processing system. HBT is for advancing time during a period in which no data is generated. Each HBT has an HBT flag which indicates that it is an HBT, and time information which indicates the time of generation of the HBT.

To give an example, in join operation where data sources of two or more inputs are joined, the data sources of two or more inputs are obtained in chronological order. In the case where the first input includes an input from the data sources and the second input does not include an input from the data sources, data having an earlier time than that of the data sources of the first input may be input to the second input. Because of this fear, the first input may not be processed, resulting in a wait. In such a case, the wait is solved if an HBT having time information that is newer than that of the data sources of the first input is input to the data sources of the second input, thereby enabling the system to process the first input.

One of the known methods is disclosed in Yijian Bai, Hetal Thakkar, Haixun Wang, Carlo Zaniolo: "Optimizing Timestamp Management in Data Stream Management Systems", IEEE 23rd International Conference on Data Engineering 2007, ICDE 2007, 15-20, April 2007, pp. 1334-1338, where each query maintains two states: an yield state (which means that there is data in an output queue) and a more state (which means that there is data in an input queue) to help determine an operator to be executed next. The method disclosed in Yijian Bai, Hetal Thakkar, Haixun Wang, Carlo Zaniolo: "Optimizing Timestamp Management in Data Stream Management Systems", IEEE 23rd International Conference on Data Engineering 2007, ICDE 2007, 15-20, April 2007, pp. 1334-1338 executes an execution tree starting from its input side and going as far along the execution tree as possible, and then tracks the execution tree back to an operator that may be executed next. When the execution tree is tracked back to the input of stream data, Enabling Time-Stamps (ETSs, corresponding to HBTs) are propagated.

Another known method is disclosed in US 2008/0072221, where one logical time period is assigned to a plurality of physical time periods in dispersed input sources, and event streams are rearranged within a buffer according to their "output bookmark" values.

SUMMARY OF THE INVENTION

Take a system that sells and buys stocks as an example. To the system, how fast the system may respond to a change in stock price is one of the most important matters. Storing stock data in a storage system temporarily and then conducting a search concerning the stored data as in conventional DBMSs takes too long for the speed of change in stock price, possibly causing the system to miss a business chance. U.S. Pat. No. 5,495,600, for example, discloses a mechanism that executes a stored query cyclically, but it is difficult to apply the mechanism to processing of real-time data such as stock prices, in which executing a query the instant data is input is important.

In C. J. Date, Hugh Darwen: "A Guide to SQL Standard (4th Edition)", the United States, Addison-Wesley Professional, Nov. 8, 1996, ISBN: 021964260 where HBTs are generated and processed regularly within the data processing system, processing timing is bound by the HBTs, with the result that the HBT transmission interval appears as an average latency from data generation to event extraction. Reducing the latency requires an increased HBT generation rate, which causes a rise in CPU load, lowering in throughput and, ultimately, an overhead.

Further, in the case where a plurality of computers are involved and time information in a first computer is used by a second computer for stream data processing, the need to transmit the time information in the first computer to the second computer creates a problem similar to the one described above.

In Yijian Bai, Hetal Thakkar, Haixun Wang, Carlo Zaniolo: "Optimizing Timestamp Management in Data Stream Management Systems", IEEE 23rd International Conference on Data Engineering 2007, ICDE 2007, 15-20, April 2007, pp. 1334-1338, too, there are other cases than data input where HBTs are generated, such as a range window operator that generates a minus tuple (Negative Tuple Approach) or an RStream operator, which may not be dealt with by the method disclosed in Yijian Bai, Hetal Thakkar, Haixun Wang, Carlo Zaniolo: "Optimizing Timestamp Management in Data Stream Management Systems", IEEE 23rd International Conference on Data Engineering 2007, ICDE 2007, 15-20, April 2007, pp. 1334-1338. There may arise another problem that a long execution tree with may queries registered needs to be tracked back many times.

In US 2008/0072221, HBTs are generated regularly, leaving unsolved the problem of a rise in CPU load, lowering in throughput and, ultimately, an overhead as a result of increasing the HBT generation rate in an attempt to reduce the latency.

Stream data processing systems are thus expected to be applicable to fields where real-time processing is necessary, as typified by financial applications, traffic information systems, distribution systems, traceability systems, sensor monitoring systems, and computer system management.

To summarize, stream data processing requires a data processing system to internally perform regular generation and processing of time control information for advancing time during a period in which no data is generated, in order to implement such processing as event extraction through an analysis in which a plurality of data sources are combined, or the extraction of events that have occurred within a given period of time. However, with the processing timing determined by the time control information, the transmission interval of the time control information undesirably appears as an average latency (latency within a given period of time) from data generation to event extraction. In other words, when there is executable processing during a period in which time control information for advancing time is waited for, the processing start time in the data processing system is bound by the time control information, and the period in which the time control information is waited for appears as the latency. Reducing the latency requires an increased generation rate of the time control information, which causes a rise in CPU load, lowering in throughput and, ultimately, an overhead.

Further, in the case where a plurality of computers are involved and time information in a first computer is used by a second computer for stream data processing, the need to transmit the time information in the first computer to the second computer creates a problem similar to the one described above.

This invention has been made in view of the problems described above, and it is therefore an object of this invention to insert time control information in stream data processing at the time when the time control information is needed.

According to this invention, a machine-readable medium for storing a stream data processing program for receiving, as primary information, stream data input to a computer comprising a processor and a storage system, creating secondary information by obtaining a given period of the received primary information as a processing target, and generating time control information indicating advance of time in addition to the primary information, wherein the stream data processing program controls the computer to execute the procedures of: receiving the input stream data as the primary information; calculating, by a time control information generation module for generating, as the time control information, time information at a time of reception of the primary information, a time at which the time control information is generated as a next ignition time, and storing the next ignition time in a next ignition time holding area, which is set in the storage system; generating the time control information when current time information reaches the next ignition time held in the next ignition time holding area; and creating, upon reception of the generated time control information, secondary information by obtaining the given period of the received primary information as the processing target.

By applying this invention, stream data processing that is small in latency is accomplished while the amount of the time control information is reduced.

BRIEF DESCRIPTION OF THE DRAWINGS

FIG. 4 shows a first embodiment of this invention, and is an explanatory diagram illustrating a description example of a preferable command for causing the command input module 210 to register or set the stream data 21 in the stream data processing sever 100.

FIG. 5 shows a first embodiment of this invention, and is an explanatory diagram illustrating a description example of a preferable command for causing the command input module 210 to register or set a query registration command in the stream data processing sever 100.

FIG. 7 shows a first embodiment of this invention, and is an explanatory diagram illustrating a configuration example of the query execution tree analysis result management table 235.

DETAILED DESCRIPTION OF THE PREFERRED EMBODIMENTS

Hereinafter, description is made of the first embodiment of this invention with reference to the drawings.

Figure 1:
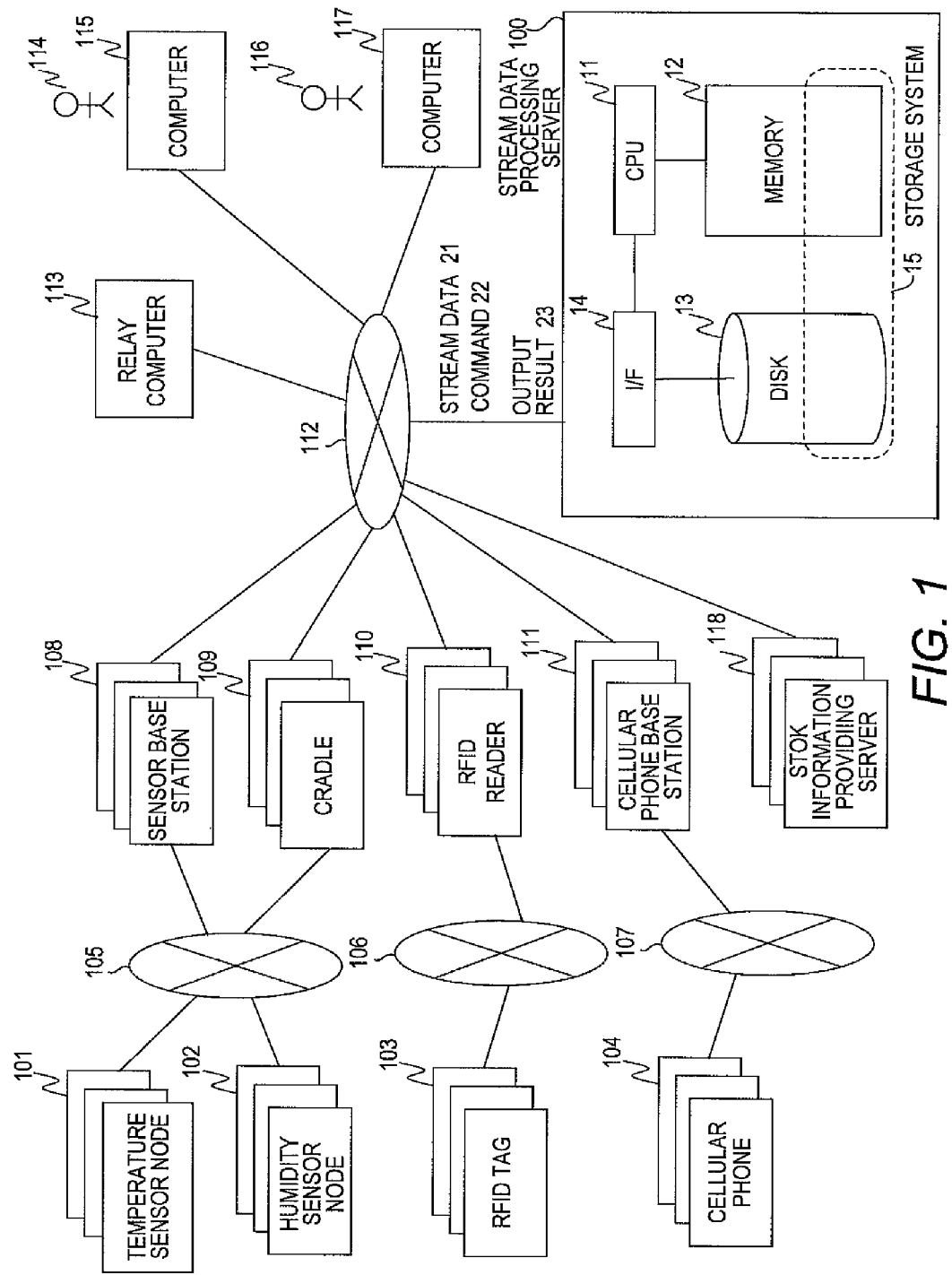
FIG. 1 shows a first embodiment of this invention, and is a block diagram showing a hardware configuration of a stream data processing system.

FIG. 1 illustrates a hardware configuration of a stream data processing sever 100. The stream data processing server 100 is executed on one computer, and includes a CPU 11 for performing an operation processing, a memory 12 for storing stream data 21 and a program for a stream data processing, a disk drive 13 for storing data, and an interface 14 for coupling the CPU 11 to the disk drive 13 and a network 112. It should be noted that the stream data processing sever 100 may be executed on a plurality of computers.

Sensor nodes such as a temperature sensor node 101 and a humidity sensor node 102 output data to be input as the stream data 21, and are connected to a sensor base station 108 and a cradle 109 via a network 105. In addition, an RFID tag 103 is connected to a radio frequency identification (RFID) reader 110 via a network 106. In addition, a cellular phone 104 is connected to a cellular phone base station 111 via a network 107. In addition, a stock information providing server 118 which distributes stock price information may be input as the stream data 21.

Connected to the network 112 are the sensor base station 108, the cradle 109, the RFID reader 110, the cellular phone base station 111, the stock information providing server 118, a relay computer 113 for executing an application such as sensor middleware or an RFID middleware, a computer 115 for inputting a command to the stream data processing sever 100, and a computer 117 that uses an output result 23 output from the stream data processing sever 100.

The sensor base station 108 outputs measurement results (for example, temperature and humidity) from the temperature sensor node 101 and the humidity sensor node 102, respectively, and the RFID reader 110 outputs information read from the RFID tag 103. The cellular phone base station 111 outputs information received from the cellular phone 104. Those outputs are input to the stream data processing sever 100 as the stream data 21. The stream data 21 may be input to the stream data processing sever 100 directly from the sensor base station 108, the cradle 109, the RFID reader 110, the cellular phone base station 111, and the stock information providing server 118 via the network 112, or after having been processed by the relay computer 113, the stream data 21 may be input to the stream data processing sever 100.

In addition, a command 22 ordered by a user 114 or the command 22 generated by the computer 115 is input to the stream data processing sever 100 via the network 112.

The output result 23 that is a result processed by the stream data processing sever 100 is output to the computer 117 that is used by a user 116 via the network 112.

In this case, the stream data processing sever 100, the relay computer 113, the computer 115, and the computer 117 are configured by an arbitrary computer system including a personal computer and a workstation, and may be the same computer or different computers. In addition, the user 114 and the user 116 may be the same user or different users. In addition, the networks 105, 106, 107, and 112 may be one of: a local area network (LAN) based on a connection by an Ethernet (registered trademark), an optical fiber, a fiber distributed data interface (FDDI), a radio, or the like; a wide area network (WAN) including an Internet lower in speed than the LAN; a public telephone network; and a similar technology which are invented in the future.

Here, a storage system 15 illustrated in FIG. 1 includes a predetermined area of the memory 12 and a predetermined area of the disk drive 13. The stream data 21 is stored in the storage system 15 mainly within the memory 12, which allows a high speed search in response to a query. The stream data processing sever 100 that manages the continuously-changing stream data 21 stores data to be a search target in the storage system 15 within the memory 12, and data that is no longer needed for the purpose of the high speed search may be stored in the storage system 15 within the disk drive 13. For example, in a case where the stream data 21 represents a measurement value (such as a temperature) output from the temperature sensor node 101, the measurement value to be monitored according to an intention of the user 114 may be a today's value, and hence there arises no problem even if a value obtained on a previous day may not be searched for at high speed. Therefore, the stream data processing sever 100 may store the today's measurement value within the memory 12, the measurement value obtained on a previous day within the disk drive 13 as an archive. Here, the storage system 15 may be any recording medium such as a memory, a disk, a tape, and a flash memory. In addition, the storage system 15 may have a hierarchical structure including a plurality of recording media. In addition, the storage system 15 may be realized by a similar technology which is invented in the future.

In FIG. 1, the stream data processing sever 100 is a computer (or server) that executes the stream data processing, in which information transmitted in real time from the sensor base station 108, or from the RFID reader 110, or from an application that is run on the relay computer 113, is input to the stream data processing sever 100 via the I/F 14 as the stream data 21, the input stream data 21 is converted into a significant information according to the command 22, which is input from the user 114 or from an application run on the computer 115, so as to be created as the output result 23, and the output result 23 is provided to the user 116 or to an application run on the computer 117. The stream data 21 includes a plurality of stream data $21_1, 21_2, \ldots, 21_n$.

The computer 115 is connected to the stream data processing sever 100 via the network 112. The application run on the computer 115 and the application run on the computer 117 may be the same application or different applications.

The stream data 21 discussed in this embodiment differs from a stream used in the distribution of video and sound, in that each piece of stream data corresponds to significant information. The stream data 21 which the stream data processing sever 100 receives from the sensor base station 108, or from the RFID reader 110, or from an application run on the relay computer 113 is continuous or intermittent, and each piece of stream data contains different product information or a different element.

Figure 2:
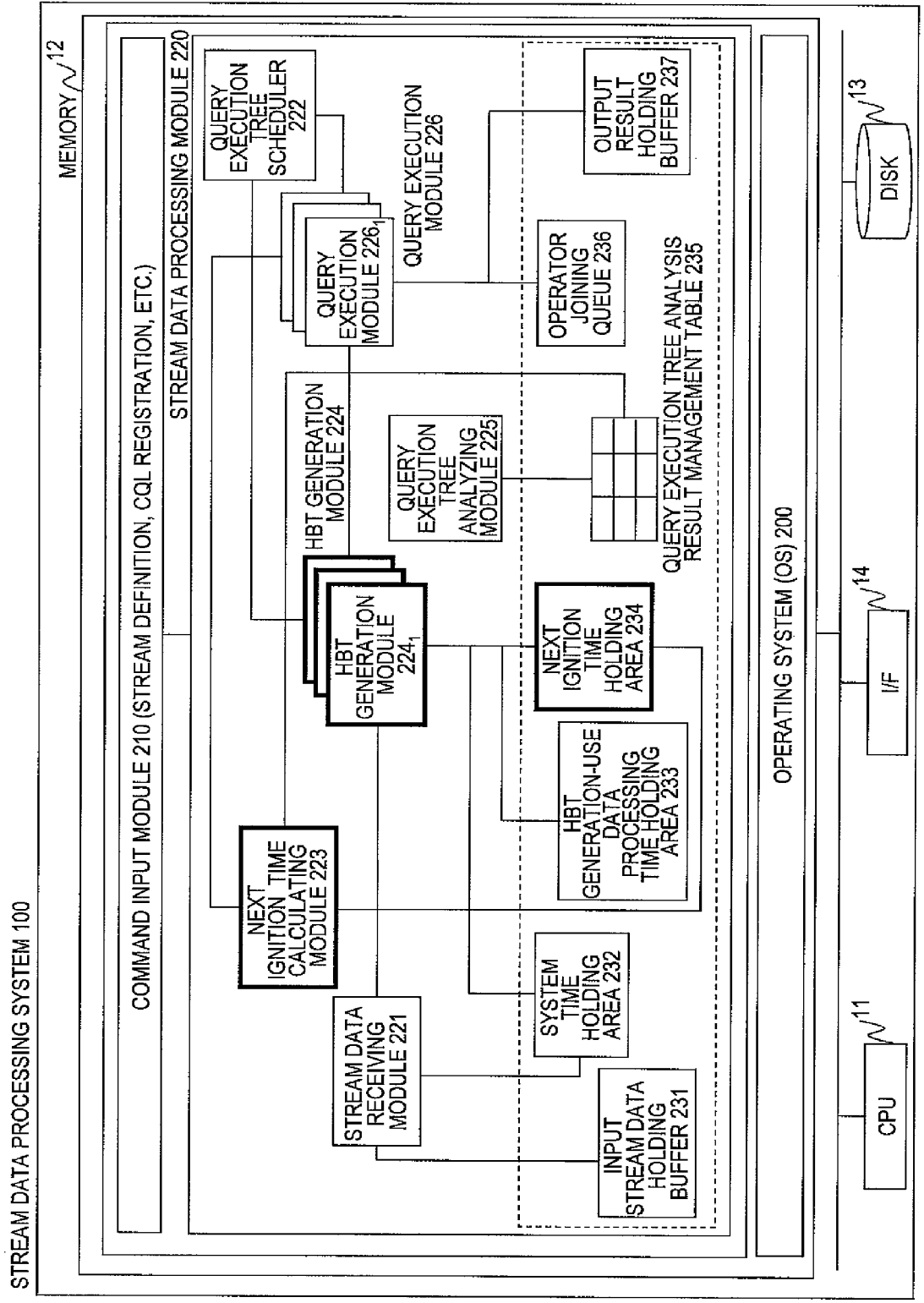
FIG. 2 is a block diagram illustrating a stream data processing system to which a first embodiment of this invention is applied and a relevant system configuration.

FIG. 2 is a block diagram illustrating a stream data processing system to which an embodiment of this invention is applied and a relevant system configuration.

The stream data processing sever 100 includes the CPU 11, the memory 12, the disk 13, and the I/F 14. The memory 12 contains an operating system (OS) 200, a command input module 210, and a stream data processing module 220. The stream data processing module 220 and the command input module 210 are constituted of programs and stored in the disk 13 or other storage media. When stream data processing is performed, the CPU 11 loads the stream data processing module 220 and the command input module 210 onto the memory 12 to execute the modules 210 and 220.

The command input module 210 receives a command input by the user 114 or by the application running on the computer 115. Subsequently, the stream data processing module 220 converts, based on the query which has been received by the command input module 210 which represents a content of a processing for converting information on the stream data into significant information, the information on the stream data 21 into significant information, and outputs the significant data.

Referring to FIG. 2, description is made of an outline of this invention. In the stream data processing sever 100, based on the query input by the user 114 or by the application running on the computer 115, the query execution module 230 reads the stream data 21, converts the information on the stream data 21 into significant information, and then outputs the output result 23. Here, the term "significant information" represents, for example, information obtained by converting the measurement value output from the temperature sensor node 101 illustrated in FIG. 1, which would not be understood by the user 114 or 116 if remaining being a data series of measurement value, into an average value of temperatures obtained within a predetermined time.

Hereinafter, detailed description is made of the configuration of the stream data processing sever 100.

The command input module 210 includes an interface (hereinafter, referred to as I/F) for receiving the command 22 ordered by the user 114 through the computer 115, or the command 22 input by an application running on the computer 115. In the case where the command 22 is a command relevant to stream data, the stream data processing module 220 receives the command input from the command input module 210 as a stream data registration/change command for registering or changing the stream data, and updates a table (not shown) that is used to manage stream data.

In the case where the command 22 is a command relevant to a query, the stream data processing module 220 receives the command input from the command input module 210 as a query registration/change command for registering or changing the query, updates a table (not shown) the is used to manage queries, and creates or changes an execution tree that indicates the specifics of stream data processing to be executed in response to the query command. The stream data processing module 220 transmits the created execution tree to a query execution module 226 to be stored.

The stream data processing module 220 includes a stream data receiving module 221, a query execution tree scheduler 222, a next ignition time calculating module 223, a heartbeat tuple (HBT) generation module 224, a query execution tree analyzing module 225, the query execution module 226, an input stream data holding buffer 231, a system timestamp holding area 232, an HBT generation-use data processing time holding area 233, a next ignition time holding area 234, a query execution tree analysis result management table 235, an operator joining queue 236, and an output result holding buffer 237.

The input stream data holding buffer 231 is a buffer that holds the stream data 21 input to the stream data processing sever 100 via the I/F 14. The system timestamp holding area 232 is a area for holding the current time of the system. The current time of the system in this embodiment is absolute time information (e.g., current time managed by the OS 200) that the stream data processing sever 100 has. Alternatively, the current time of the system may be a value updated with time information that is input from the outside of the stream data processing sever 100. For example, time information attached to the stream data 21 may be used to update the current time of the system when the stream data 21 containing the latest time information is input.

The stream data receiving module 221 obtains the stream data 21 of the input stream data holding buffer 231, attaches the current time of the system that has been held in the system timestamp holding area 232 to the obtained stream data 21, and outputs the resultant data to the HBT generation module 224.

The query execution module 226 indicates how the stream data 21 is to be processed, and contains processing modules such as window operation, filter operation, projection operation, join operation, and aggregation operation which are arranged in a tree structure. In the following description, these processing modules are called operators, and the tree structure is referred to as execution tree. An execution tree in the query execution module 226 is created when a command relevant to a query is input to the command input module 210. The query execution module 226 receives data output from the HBT generation module 224, and stores a result of processing executed by the operators that constitute the execution tree, in the output result holding buffer 237. Midway results of processing executed respectively by the operators are stored in the operator joining queue 236. The execution tree of the query execution module 226 is similar to the one disclosed in JP 2008-123426 A, which has been filed by the applicant of this invention, and is not described in detail here.

The query execution tree scheduler 222 controls the HBT generation module 224 and the order of executing operators in the query execution module 226.

The operator joining queue 236 is a buffer that holds midway results of processing executed respectively by the operators. The output result holding buffer 237 is a buffer that stores a processing result output from the query execution module 226. The output result stored in the output result holding buffer 237 is output to the computer 117, which is illustrated in FIG. 1, via the I/F 14.

The query execution tree analyzing module 225 analyzes an execution tree in the query execution module 226 to extract an operator that generates the HBT at a time different from the time of reception of the stream data 21, and stores the extracted operator and query settings information in the query execution tree analysis result management table 235. The query execution tree analysis result management table 235 is a table that stores an analysis result obtained by the query execution tree analyzing module 225.

The next ignition time calculating module 223 refers to the query execution tree analysis result management table 235 to calculate a next ignition time, based on time information of input stream data and the query settings information which is stored in the query execution tree analysis result management table 235, and stores the calculated next ignition time in the next ignition time holding area 234.

A next ignition time is a time at which processing is started in the query execution module 226 on other occasions than the arrival of the stream data 21.

The next ignition time calculating module 223 is called up when an operator extracted by the query execution tree analyzing module 225 is executed in the query execution module 226. The next ignition time holding area 234 is a area for holding a next ignition time calculated by the next ignition time calculating module 223.

The HBT generation module 224 obtains the stream data 21 from the stream data receiving module 221, stores the time of reception of the stream data 21 in the HBT generation-use data processing time holding area 233, and outputs the stream data 21 to the query execution module 226. The HBT generation-use data processing time holding area 233 is a area for holding a final time at which the HBT generation module 224 finishes processing the stream data 21.

The HBT generation module 224 also refers to the system timestamp holding area 232, the HBT generation-use data processing time holding area 233, and the next ignition time holding area 234. Using the current time of the system which is held in the system timestamp holding area 232, the next ignition time which is held in the next ignition time holding area 234, and the final processing time of the HBT generation module 224 which is held in the HBT generation-use data processing time holding area 233, the HBT generation module 224 outputs an HBT to the query execution module 226 at the ignition time. Details of this process are described later.

The stream data 21, the output result 23, HBTs, which are described later, and temporarily stored data, which is kept by an operator for processing, may have any data format including the tuple format (record format), the XML format, and the CSV file format. The tuple format is used in the example given below.

The stream data 21, the output result 23, HBTs, which are described later, and temporarily stored data, which is kept by an operator for processing, do not need to be actual data, and may include partially or entirely a pointer that points to the actual data.

Figure 3A:
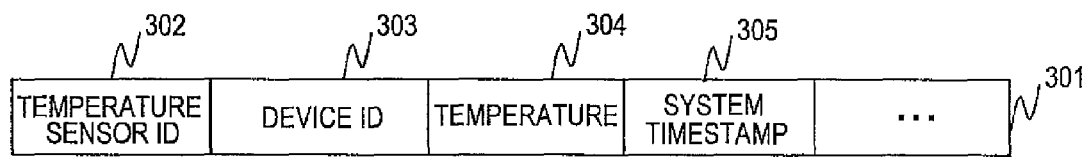
FIG. 3A shows a first embodiment of this invention, and is a diagram schematically illustrating an example of a preferable data format of the stream data 21.
Figure 3B:
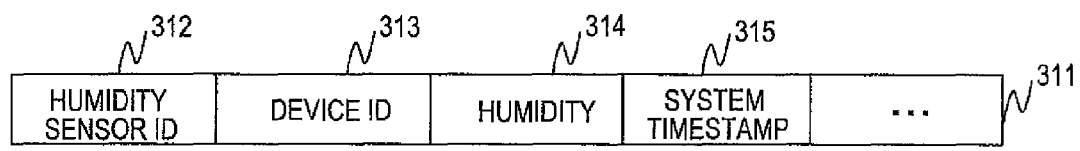
FIG. 3B shows a first embodiment of this invention, and is a diagram schematically illustrating an example of a preferable data format of the stream data 21.

FIGS. 3A and 3B are diagrams each schematically illustrating an example of a preferable data format of the stream data 21. FIG. 3A illustrates temperature stream data (S1) $21_1$, which is output from the temperature sensor node 101. FIG. 3B illustrates humidity stream data (S2) $21_2$, which is output from the humidity sensor node 101.

The temperature stream data (S1) $21_1$ is of record format, and a temperature sensor ID column 302, a device ID column 303, a temperature column 304, and a system timestamp column 305, which constitute a record, correspond to segments. A combination of the temperature sensor ID column 302, the device ID column 303, the temperature column 304, and the system timestamp column 305 is referred to as tuple 301.

As the value of the system timestamp column 305, the stream data processing sever 100 attaches time information indicating a time at which the temperature stream data (S1) $21_1$ arrives at the stream data processing sever 100 when the data is input thereto.

Alternatively, time information that is attached to the stream data before the stream data is input to the stream data processing sever 100 may be used as the value of the system timestamp column 305. For example, the value of the system timestamp column 305 may be time information attached by the temperature sensor 101, or the sensor base station 108, or sensor net middleware or other applications running on the relay computer 113, before the temperature stream data (S1) $21_1$ is input to the stream data processing sever 100.

The humidity stream data (S2) $21_2$ of FIG. 3B is of another record format, and a humidity sensor ID column 312, a device ID column 313, a humidity column 314, and a system timestamp column 315, which constitute a record, correspond to a segment. A combination of the humidity sensor ID column 312, the device ID column 313, the humidity column 314, and the system timestamp column 315 is referred to as tuple 311.

As the value of the system timestamp column 315, the stream data processing sever 100 attaches time information indicating a time at which the humidity stream data (S2) $21_2$ is input to and arrives at the stream data processing sever 100 when the data is input thereto.

Alternatively, time information that is attached to the stream data before the stream data is input to the stream data processing sever 100 may be used as the value of the system timestamp column 315. For example, the value of the system timestamp column 315 may be time information attached by the temperature sensor 101, or the sensor base station 108, or sensor net middleware or other applications running on the relay computer 113, before the humidity stream data (S2) $21_2$ is input to the stream data processing sever 100.

FIG. 4 is an explanatory diagram illustrating a description example of a preferable command for causing the command input module 210 to register or set the stream data 21 in the stream data processing sever 100.

A stream registration command 401 is instructed by the user 114 from the computer 115 or registered through the command input module 210 from the application 116 running on the client computer 115. The stream registration command 401 represents a command for registering stream data that is the temperature stream data (S1) $21_1$ constituted of a temperature sensor ID holding an integer type (int type), a device ID holding an integer type (int type), and a temperature holding a floating point type (double type), which correspond to the temperature sensor ID column 302, the device ID column 303, and the temperature column 304, respectively, illustrated in FIGS. 3A and 3B.

In addition, a stream registration command 402 represents a command for registering stream data that is the humidity stream data (S2) $21_2$ constituted of a temperature sensor ID holding an integer type (int type), a device ID holding an integer type (int type), and a temperature holding a floating point type (double type), which correspond to the temperature sensor ID column 312, the device ID column 313, and the temperature column 314, respectively, illustrated in FIGS. 3A and 3B.

The command input module 210 may transform commands for registering/setting the stream data 21 in the stream data processing sever 100 into a table format to keep a table where the commands are held in a storage medium.

In this embodiment, the system timestamp column 305 and the system timestamp column 315 are automatically included, but the stream registration command 411 may be specified explicitly as "register stream temperature stream (timestamp, temperature sensor ID int, device ID int, temperature double);".

In addition, this embodiment has been described by taking an example where a command is registered in a command line interface (CLI) format, but there is no limitation thereto. For example, a graphical user interface (GUI), an input in a table format, an input through a setting file, and an input through an XML file may be used to perform an input having the same meaning as described above. The same holds true of the following commands.

In addition, according to this embodiment, the timestamp has a format including a time and a minute such as "9:00", the timestamp may have other format such as one typified by a format additionally including a date and a second such as "2007/9/21 9:00:00 JST". The same holds true in the following drawings.

FIG. 5 is an explanatory diagram illustrating a description example of a preferable command for causing the command input module 210 to register or set a query registration command in the stream data processing sever 100.

A query registration command 501 is registered by the user 114 or the application 116 running on the client computer 115, through the command input module 210.

The query registration command 501 is for registering a query that indicates the following processing, in which: among the past two minutes ([Range 2 minutes]) of the temperature stream data (S1) $21_1$ and one latest piece ([Partition by S1 temperature sensor ID rows 1]) of the humidity stream data (S2) $21_2$ of each humidity sensor ID, a tuple of the temperature stream data (S1) $21_1$ and a tuple of the humidity stream data (S2) $21_2$ are joined (WHERE S1. temperature sensor ID=S2. humidity sensor ID) only when a condition that the temperature of the temperature stream data (S1) $21_1$ is 20° or higher (S1. temperature>=20) and a condition that the humidity of the humidity stream data (S2) $21_2$ is 60% or higher (S2. temperature>=60) are satisfied, and the temperature sensor ID of the temperature stream data (S1) $21_1$ matches the humidity sensor ID of the humidity stream data (S2) $21_2$, and an average value of the temperature (Avg(S1. temperature)) and an average value of the humidity (Avg (humidity)) are calculated on a device ID basis (GROUP BY S1. device ID), and only increments of tuples each constituted of a temperature sensor ID, the average value of the temperature, and the average value of the humidity are turned into stream data (ISTREAM), which is output with a delay of one minute (<1 minute>).

In a query registration command 502, "[Range 2 minutes]" of the query registration command 501 is replaced with "[Jumping 10 minutes]", which indicates that processing target is switched at ten-minute intervals. For instance, while data input at 9:01 is a processing target until 9:03 and data input at 9:04 is a processing target until 9:06 in the case of time window (Range 2 minutes), data input at 9:01 and data input at 9:04 are both processing targets in a 9:00-9:10 period (from 9:00 up to and not including 9:10) and the processing target is switched upon 9:10 to data input in a 9:10-9:20 period in the case of jumping window (Jumping 10 minutes). Further, "ISTREAM ( )<1 minute>" of the query registration command 501 is replaced with "RSTREAM [5 minutes]" in the query registration command 502, and hence a tuple group of the average values is output for every five minutes.

The command input module 210 may transform commands for registering/setting a query registration command in the stream data processing sever 100 into a table format to keep a table where the commands are held in a storage medium.

Figure 6:
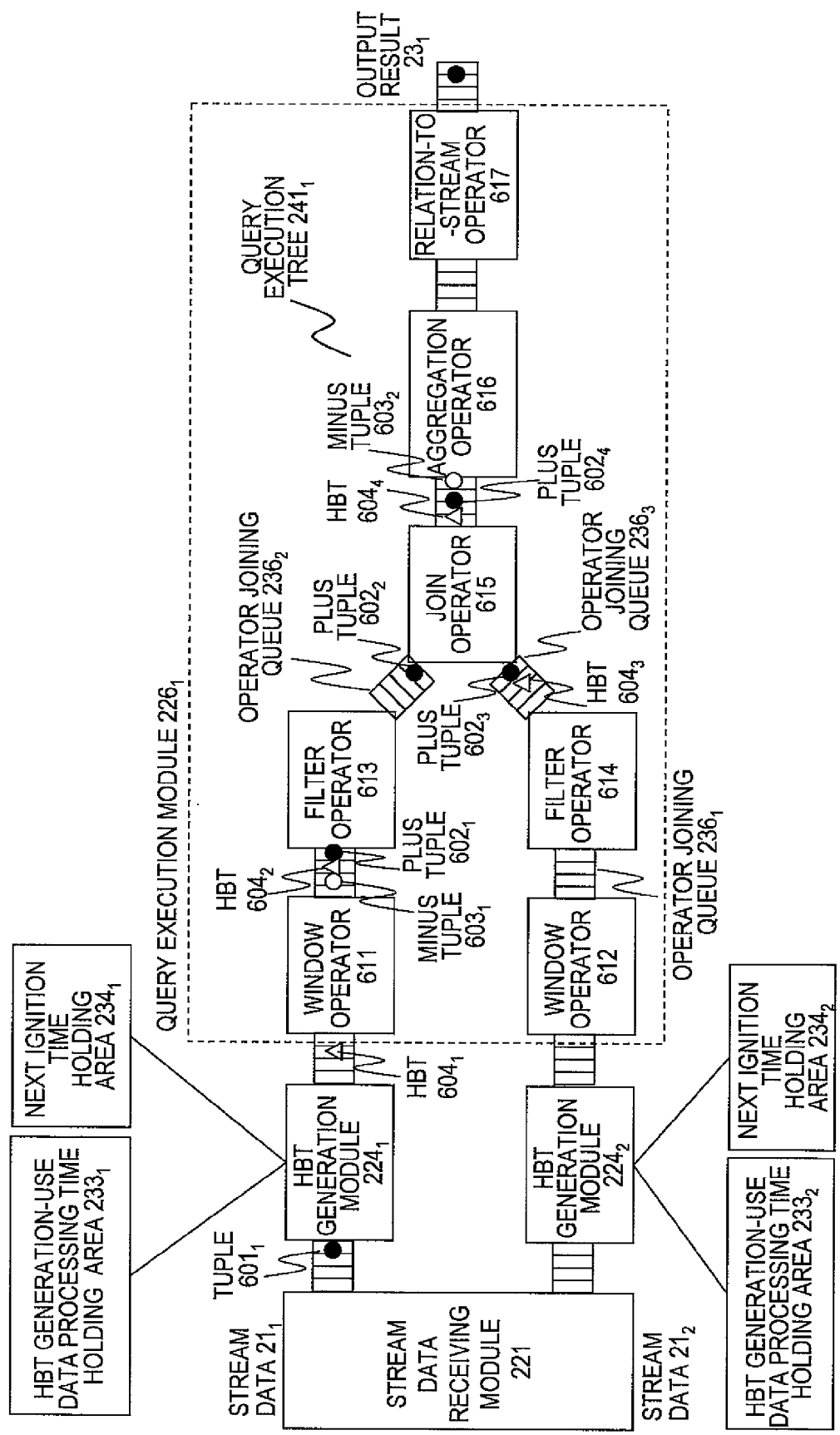
FIG. 6 shows a first embodiment of this invention, and is an explanatory diagram illustrating an example of the query execution module 226.

FIG. 6 is an explanatory diagram illustrating an example of the query execution module 226.

A query execution module $226_1$ represents the query execution module 226 that is created when the query registration commands 501 and 502 of FIG. 5 is executed. The query execution module 226 includes operators for performing processing and an operator joining queue 236 which links one operator with another. In this explanatory diagram, the left end is the input side and the right end is the output side. The stream data 21 is input as input data. Each piece of data in a data row input as the stream data 21 is referred to as tuple 601. The tuple 601 is processed by the operators and stored in the operator joining queue 236. After processed in the stream data receiving module 221 and the HBT generation module 224, which are illustrated in FIG. 2, the tuple 601 is input to the query execution module 226 via the operator joining queue 236. A query processing result of an execution tree 241 is output as the output result 23. The output result 23 may be re-input as different stream data 21.

The operators vary in type depending on their processing contents. Window operators 611 and 612 illustrated in FIG. 6 cut out data rows from the stream data 21 by specifying the number of data rows or a time interval for cutting out data rows, and perform a processing of converting the stream data into a tuple set. The tuple cut out are held in the window operators 611 and 612. Filter operators 613 and 614 perform a processing of determining whether or not the tuples 301 and 311 illustrated in FIGS. 3A and 3B, respectively, are output, based on predetermined conditions. A join operator 615 performs a processing of joining two or more stream data 21 under a given condition. An aggregation operator 616 performs an aggregation processing represented by derivation of a sum, an average, a maximum, a minimum, or the like. A relation-to-stream operator 617 performs a processing of converting the tuple set as the output result 23 into the stream data 21. In addition to the operators illustrated in FIG. 6, there are a projection operator for performing a processing of outputting only a portion of the columns of the delay tuple 203 and other such operators.

An execution tree $241_1$ represents the execution tree 241 that is created when the query registration commands 501 and 502 illustrated in FIG. 5 are executed. The temperature stream data $21_1$ and the humidity stream data $21_2$ are input data of the execution tree $241_1$. The window operator 611 keeps past two minutes of ([Range 2 minutes]) the temperature stream data $21_1$, and outputs a tuple that has newly entered the window and a tuple that has left the window, to the filter operator 613.

The window operator 612 holds the tuple of the humidity stream data $21_2$ within the range of past two minutes ([Range 2 minutes]) in the window operator 612, and outputs to the filter operator 614 a tuple that has newly entered a window and a tuple that has left the window.

From among tuples output from the window operator 611, the filter operator 613 outputs a tuple that satisfies the condition that the temperature is 20° C. or higher (S1.humidity>=20), to the join operator 615.

From among tuples output from the window operator 612, the filter operator 614 outputs a tuple that satisfies the condition that the humidity is 60% or higher (S2.humidity>=60), to the join operator 615.

If the temperature sensor ID of the tuple output from the filter operator 613 matches the humidity sensor ID of the tuple output from the filter operator 614 (WHERE S1.temperature sensor ID=S2.humidity sensor ID), the join operator 615 joins the two tuples, and outputs those tuples to the aggregation operator 616. It should be noted that in order to select the tuples to be joined, the join operator 615 holds the tuples output from the filter operators 613 and 614 in the temporary storage areas. It should be noted that the tuples held in the temporary storage areas may be data entities or may be data containing pointers directed to the window operators 611 and 612.

With respect to tuples output from the join operator 615, the aggregation operator 616 calculates the average value of the temperature of the temperature stream data $21_1$ (Avg (S1.temperature)) and the average value of the humidity (Avg (S2.humidity)) on a device ID basis (GROUP BY S1. device ID), and outputs the temperature sensor ID, the average value of the temperature, and the average value of the humidity to the relation-to-stream operator 617. It should be noted that the aggregation operator 616 holds tuples for calculating an aggregation value, in the temporary storage area.

From among tuples output from the aggregation operator 616, the relation-to-stream operator 617 converts a tuple that exhibits an increase into a stream by 1 minute (ISTREAM <1 minute>), and outputs the stream as the output result $23_1$.

An example of the operation of the execution tree $241_1$ is as follows.

Consider a case where a tuple (temperature sensor ID, device ID, temperature)=(1001, 201, 23° C.) is input at 9:00 to the temperature stream data $21_1$. The stream data receiving module 221 attaches current system timestamp information to the tuple as the value of the system timestamp column 305 illustrated in FIG. 3, and outputs a tuple $601_1$ (temperature sensor ID, device ID, temperature, system timestamp)= (1001, 201, 23° C., 9:00).

An HBT generation module $224_1$ outputs a heartbeat tuple (HBT) $604_1$ for advancing the time within the query execution module 226 during a period in which no data is generated. The HBT $604_1$ has an HBT flag which indicates that it is an HBT, and a system timestamp. For example, the HBT $604_1$ that is output at 9:03 is "(HBT, 9:03)". An HBT updates an operator processing time, which is managed by each operator, upon reception of the HBT by the operator, and is stored in the next operator joining queue 236. How an HBT is generated is described later.

When the window of data that the window operator 611 cuts out is the past two minutes of data ([Range 2 minutes]), the processing target period (lifetime) of the tuple $601_1$ is from 9:00 to 9:02.

In order to designate the lifetime of the tuple $601_1$, the window operator 611 outputs a plus tuple $602_1$, which has a plus flag indicating the start of the lifetime of a tuple, at the beginning of the tuple's lifetime, and outputting a minus tuple $603_1$, which has a minus flag indicating the end of the lifetime of a tuple, on the expiration of the tuple's lifetime. The plus tuple $602_1$ and minus tuple $603_1$ of the tuple "(1001, 201, 23° C., 9:00)" are "(+, 1001, 201, 23° C., 9:00)" and "(−, 1001, 201, 23° C., 9:00)", respectively.

The window operator 611 outputs the tuple $602_1$ upon reception of the tuple $601_1$ and keeps the output tuple in a temporary storage area. The window operator 611 subsequently receives the HBT $604_1$ and stores an HBT $604_2$ in the operator joining queue 236. Upon reception of the HBT, the operator processing time that is managed by the window operator 611 is updated from "9:00" to "9:03", thereby allowing the window operator 611 to output the minus tuple $603_1$. When the HBT $604_1$ that is output at 9:03 is used to output the minus tuple $603_1$, a time period from 9:02 to 9:03 appears as a latency of the query execution module $226_1$. This latency corresponds to the one described above as a problem of the prior art. In order to reduce the latency in outputting the minus tuple $603_1$, the window operator 611 needs to receive the HBT at 9:02.

The minus tuple $603_1$ is also referred to as negative tuple. This embodiment may employ any other methods to designate the lifetime of a tuple than the one described above, including embedding a lifetime end indicator in the tuple.

The HBT $604_1$ is also necessary for an operator such as the join operator 615 which handles two or more inputs. For example, the join operator 615 obtains tuples from an operator joining queue $236_2$ and an operator joining queue $236_3$ in chronological order by timestamp.

In the case where a plus tuple $602_2$ "(+, 1001, 201, 21° C., 8:40)" is in the operator joining queue $236_2$ and a plus tuple $602_3$ "(+, 1001, 201, 69%, 8:30)" is in the operator joining queue $236_3$, the join operator 615 first obtains the plus tuple $602_3$ from the operator joining queue $236_3$. The join operator 615 next tries to obtain the plus tuple $602_2$ from the operator joining queue $236_2$ but fails to obtain the plus tuple $602_2$ because of the possibility that data prior to 8:40 is stored in the operator joining queue $236_3$. An HBT $604_3$ "(HBT, 8:45)" stored in the operator joining queue $236_3$ at this point allows the join operator 615 to obtain the plus tuple $602_2$ and execute processing.

The aggregation operator 616 sometimes generates a tuple called ghost, which has the same timestamp as its lifetime start time and lifetime end time and accordingly has no lifetime. For example, when the humidity columns of aggregation target tuples have values "64, 66, 68, 70, and 72", the average value of the humidity columns is "68". The arrival of a minus tuple $603_2$ "(−, 64, 8:20)" at a timestamp "8:20" changes the average value of the humidity to an average of "66, 68, 70, and 72" which is "69", and causes a plus tuple that has an aggregation value "69" to be created. However, the arrival of a plus tuple $602_4$ "(+, 74, 8:20)" which has the same timestamp changes the average value of the humidity to an average of "66, 68, 70, 72, and 74" which is "70", and a minus tuple having an aggregation value "69" and a plus tuple having an aggregation value "70" are created as a result. This makes the plus tuple having an aggregation value "69" a tuple that has no lifetime. The aggregation operator 616 may exclude the ghost if a tuple that has a system timestamp later than 8:20 arrives. For example, the arrival of the HBT $604_3$ "HBT, 8:45" which has a system timestamp "8:25" settles the aggregation value of 8:40, and enables the aggregation operator 616 to output the plus tuple having an aggregation value "70".

This embodiment uses the aggregation operator 616 to exclude the ghost but other operators may be used to exclude the ghost. For example, the ghost may be excluded by the relation-to-stream operator 617. Every aggregation operator 616 has the ghost excluding function in this embodiment. The ghost excluding function may instead be turned on or off on an individual operator basis by an input that is in the command line interface (CLI) format, the graphic user interface (GUI) format, a table format, a setting file format, or an XML file format. Alternatively, an average having the ghost excluding function may be described in a query such as AVG_G.

The chronological order of plus tuples and HBTs in an execution tree of this embodiment is never reversed within an operator joining queue and between operators that have a parent-child relation in the graph structure, and hence it is always true that a timestamp on the input side is new whereas a timestamp on the output side is old.

FIG. 7 is an explanatory diagram illustrating a configuration example of the query execution tree analysis result management table 235.

In a target operator column 701, an operator extracted by the query execution tree analyzing module 225 of FIG. 2 is stored. Stored in a setting item column 702 is an item that is set to the operator extracted by the query execution tree analyzing module 225, such as the window size, the delay size, or the output interval. Stored in a last execution time column 703 is a time at which the target operator has executed processing and output a result last time in the case where the target operator is a jumping window operator, or a relation-to-stream operator (RStream) that outputs at regular intervals.

For example, a row 704 of the query execution tree analysis result management table 235 is for an operator extracted as a result of analyzing an execution tree that is created from the query registration command 501 of FIG. 5. Details of how the operator is extracted are described later.

The row 704 illustrates that the target operator column 701, the setting item column 702, and the last execution time column 703 have a value "window operator 611 (Range Window)", a value "sliding window size=2 minutes", and "–", respectively.

The table for managing query execution tree analysis results may have any other formats than the table format illustrated in FIG. 7, and may be in a setting file format or an XML file format. The same applies to all tables described below.

Figure 8:
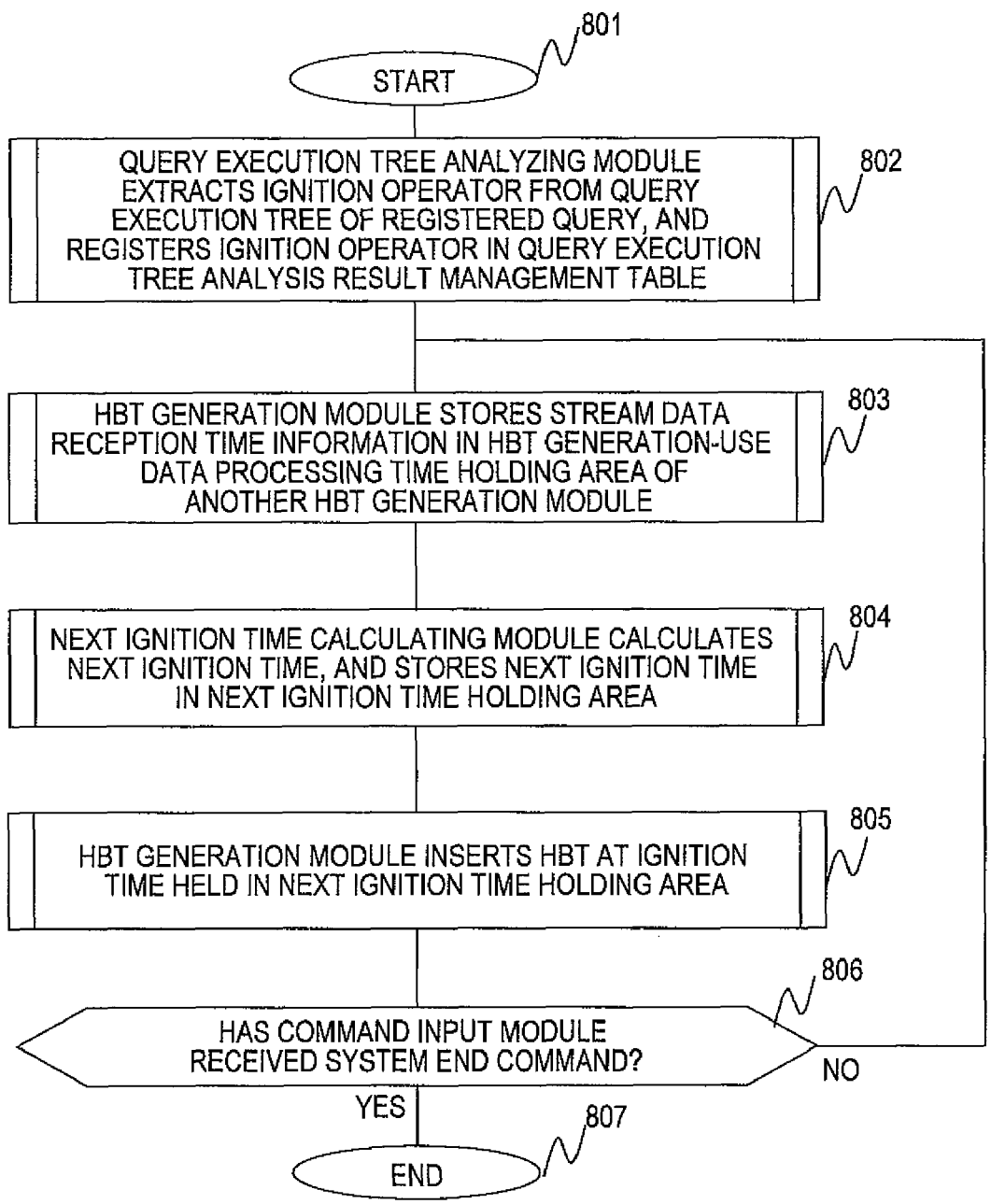
FIG. 8 shows a first embodiment of this invention, and is a flow chart illustrating overall processing of the stream data processing sever 100.

FIG. 8 is a flow chart illustrating overall processing of the stream data processing sever 100. This processing is started when, for example, an administrator of the stream data processing sever 100 activates the stream data processing module 220.

First, the query execution tree analyzing module 225 of FIG. 2 extracts an ignition operator from a query execution tree of a registered query, and registers the extracted query in the query execution tree analysis result management table 235 (802). Details of Step 802 are described later with reference to FIG. 9. An ignition operator refers to an operator that needs to start processing without waiting for the arrival of the stream data 21. An operator that has time constraints related to processing, such as an operator that outputs a processing result at regular time intervals, qualifies as the ignition operator.

Next, the HBT generation module 224 stores time information indicating the time of reception of the stream data 21 in the HBT generation-use data processing time holding area 233 of another HBT generation module 224 (803). Details of Step 803 are described later with reference to FIG. 10.

The next ignition time calculating module 223 then calculates a next ignition time and stores the calculated next ignition time in the next ignition time holding area 234 (804). Details of Step 804 are described later with reference to FIG. 11.

At the next ignition time held in the next ignition time holding area 234, the HBT generation module 224 inserts (generates) an HBT (805). Details of Step 805 are described later with reference to FIG. 12.

Whether or not the command input module 210 has received a system end command is determined next (806). When the answer to Step 806 is NO, the processing returns to Step 802. When the answer to Step 806 is YES, the processing of the stream data processing sever 100 is ended (807).

Figure 9:
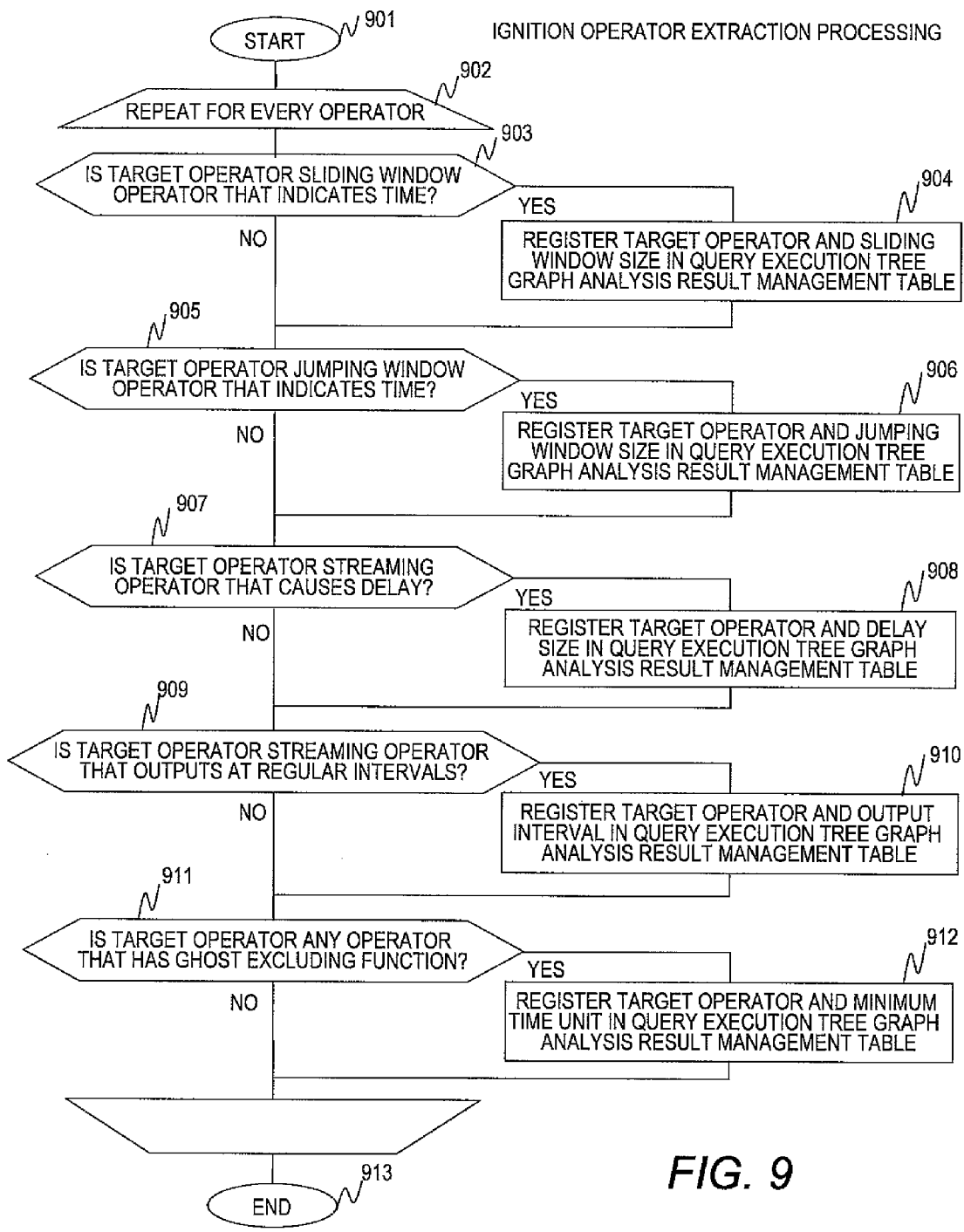
FIG. 9 shows a first embodiment of this invention, and is a flow chart illustrating the ignition operator extraction and registration processing in Step 802 of FIG. 8.

FIG. 9 is a flow chart illustrating the ignition operator extraction and registration processing in Step 802 of FIG. 8.

The query execution tree analyzing module 225 repeats Step 903 to Step 912 for every operator in the query execution module 226 of FIG. 2 (902).

First, whether or not the target operator is a sliding window operator (Range Window) that indicates a time period is determined (903). When the answer to Step 903 is YES, this target operator and the sliding window size of the target operator are registered in the query execution tree graph analysis result management table 235 (904).

When Step 904 is finished, or when the answer to Step 903 is NO, whether or not the target operator is a jumping window operator (Jumping Window) that indicates a time period is determined (905). When the answer to Step 905 is YES, this target operator and the jumping window size of the target operator are registered in the query execution tree graph analysis result management table 235 (906).

When Step 906 is finished, or when the answer to Step 905 is NO, whether or not the target operator is a relation-to-stream operator that indicates a time period and that causes a delay (IStream, DStream, IDStream) is determined (907). When the answer to Step 907 is YES, this target operator and the delay size of the target operator are registered in the query execution tree graph analysis result management table 235 (908).

When Step 908 is finished, or when the answer to Step 907 is NO, whether or not the target operator is a relation-to-stream operator that indicates a time period and that outputs at regular intervals (RStream) is determined (909). When the answer to Step 909 is YES, this target operator and the output interval of the target operator are registered in the query execution tree graph analysis result management table 235 (910).

When Step 910 is finished, or when the answer to Step 909 is NO, whether or not the target operator is an operator that has a ghost excluding function (Sum, Count, Average, MM, Max, Median, Variable, Standard Deviation, Limit) is determined (911). When the answer to Step 911 is YES, this target operator and a minimum time unit (e.g., 1 millisecond, 1 nanosecond, or a serially numbered time period under 1 millisecond) (912).

When Step 912 is finished, or when the answer to Step 911 is NO, the processing returns to Step 902 to repeat Steps 903 to 912 again. When every operator has been processed, Step 802 is finished (913).

Given below is an example in which the query execution tree analysis result management table 235 of FIG. 7 is created through the processing of FIG. 9 with the use of the query registration commands 501 and 502 of FIG. 5 and the query execution module 226₁ of FIG. 6.

The query execution module 226₁ of FIG. 6 is created upon registration of the query registration command 501 of FIG. 5. The stream data processing module 220 executes the flow chart of FIG. 9 for the query execution tree analysis result management table 235 of FIG. 7.

First, YES is given as the answer to Step 903 because the window operator 611 is a sliding window operator (Range window, [Range 2 minutes]) that indicates a time period, and "window operator 611" and "sliding window size=2 minutes" are registered in the row 704 of the query execution tree analysis result management table 235.

Next, NO is given as the answer in all of Steps 903, 905, 907, 909, and 911 because the window operator 612 is a group-based row window operator (Partitioned window, [Partition by S1 humidity sensor ID rows 1]). Similarly, the answer is NO in all of Steps 903, 905, 907, 909, and 911 for the filter operator 613, the filter operator 614, and the join operator 615.

For the aggregation operator 616 which is an operator having a ghost excluding function (Avg(S1. temperature), Avg(S2. humidity)), the answer to Step 911 is YES, and "aggregation operator 616" and "minimum time unit" are registered in a row 705 of the query execution tree analysis result management table 235.

For the relation-to-stream operator 617 which is a relation-to-stream operator that causes a delay (ISTREAM ( ) <1 minute>), the answer to Step 907 is YES, and "relation-to-stream operator 617" and "delay size=1 minute" are registered in a row 706 of the query execution tree analysis result management table 235.

When the query registration command 502 of FIG. 5 is registered, the query execution module 226 that is similar to the query execution module $226_1$ of FIG. 6 is created, and the flow chart of FIG. 9 is executed.

The description "[Jumping 10 minutes]" in the query registration command 502 creates a jumping window operator (Jumping window) that indicates a time period. Accordingly, YES is given as the answer to Step 905 and "window operator xxx" and "jumping size=10 minutes" are registered in a row 707 of the query execution tree analysis result management table 235.

The description "RSTREAM [5 minutes]" in the query registration command 502 creates a relation-to-stream operator (RStream) that outputs at regular intervals. Accordingly, YES is given as the answer to Step 909 and "window operator yyy" and "output interval=5 minutes" are registered in a row 708 of the query execution tree analysis result management table 235.

While every aggregation operator has the ghost excluding function in this embodiment, the ghost excluding function may instead be turned on or off on an individual operator basis by an input that is in the command line interface (CLI) format, the graphic user interface (GUI) format, a table format, a setting file format, or an XML file format. Alternatively, an average having the ghost excluding function may be described in a query such as AVG_G.

Through the processing described above, ignition operators that have time constraints in starting processing are registered in the query execution tree graph analysis result management table 235.

Figure 10:
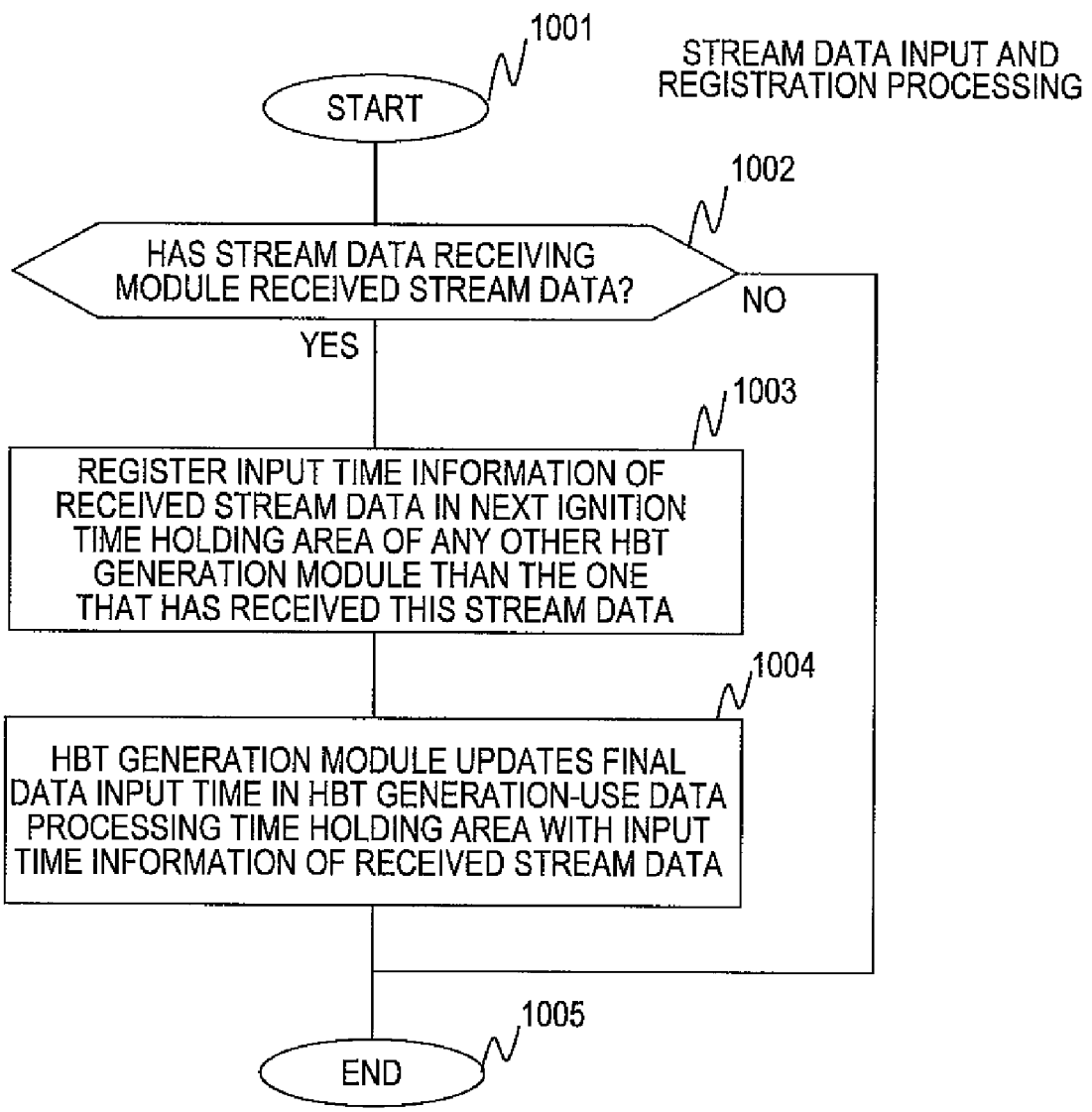
FIG. 10 shows a first embodiment of this invention, and is a flow chart illustrating the stream data input and registration processing in Step 803 of FIG. 8.

FIG. 10 is a flow chart illustrating the stream data input and registration processing in Step 803 of FIG. 8.

First, the HBT generation module 224 determines whether or not the stream data receiving module 221 illustrated in FIG. 2 has received the stream data 21 (1002). When the answer to Step 1002 is YES, the HBT generation module 224 that has received the stream data 21 registers input time information indicating the time of reception of the stream data 21 in the next ignition time holding area 234 of another HBT generation module 224 (1003). The HBT generation module 224 updates a final data input time in the HBT generation-use data processing time holding area 233 with the value of the input time information of the received stream data 21 (1004).

When Step 1004 is finished, or when the answer to Step 1002 is NO, Step 803 is ended (1005).

Figure 11:
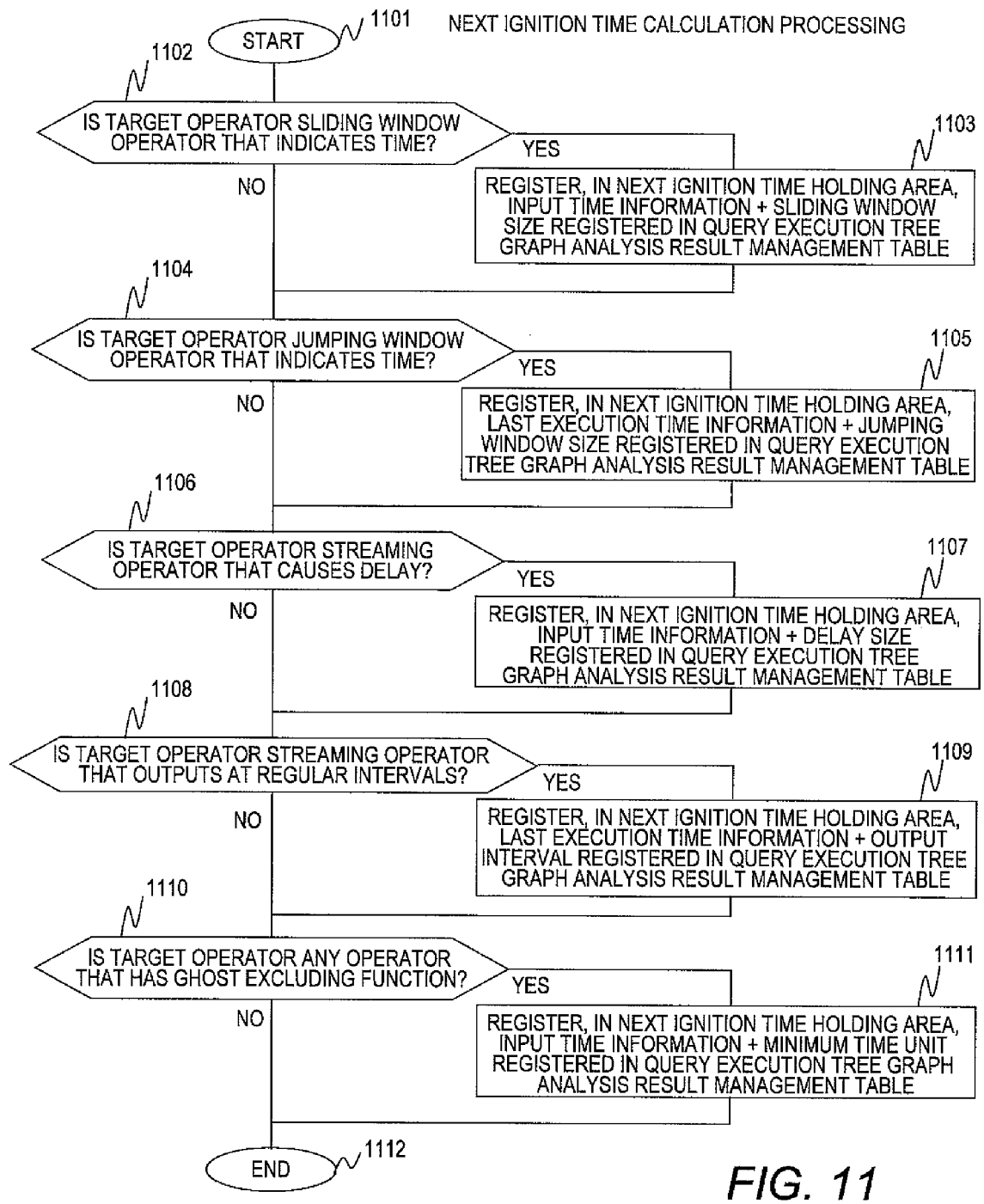
FIG. 11 shows a first embodiment of this invention, and is a flow chart illustrating the next ignition time calculation processing in Step 804 of FIG. 8.

FIG. 11 is a flow chart illustrating the next ignition time calculation processing in Step 804 of FIG. 8.

First, the next ignition time calculating module 223 determines whether or not the target operator is a sliding window operator (Range Window) that indicates a time period (1102). When the answer to Step 1102 is YES, the sum of the value of time information that is attached to a tuple input to the target operator in the query execution module 226 and the value of the sliding window size of the target operator that is registered in the query execution tree graph analysis result management table 235 is registered in the next ignition time holding area 234 (1103).

When Step 1103 is finished, or when the answer to Step 1102 is NO, the next ignition time calculating module 223 determines whether or not the target operator is a jumping window operator (Jumping Window) that indicates a time period (1104). When the answer to Step 1104 is YES, the sum of the value of time information indicating a time at which the target operator in the query execution module 226 has executed processing last time and the value of the jumping window size of the target operator that is registered in the query execution tree graph analysis result management table 235 is registered in the next ignition time holding area 234 (1105).

When Step 1105 is finished, or when the answer to Step 1104 is NO, the next ignition time calculating module 223 determines whether or not the target operator is a relation-to-stream operator (IStream, DStream, IDStream) that indicates a time period and that causes a delay (1106). When the answer to Step 1106 is YES, the sum of the value of time information that is attached to a tuple input to the target operator in the query execution module 226 and the value of the delay size of the target operator that is registered in the query execution tree graph analysis result management table 235 is registered in the next ignition time holding area 234 (1107).

When Step 1107 is finished, or when the answer to Step 1106 is NO, the next ignition time calculating module 223 determines whether or not the target operator is a relation-to-stream operator (RStream) that indicates a time period and that outputs at regular intervals (1108). When the answer to Step 1108 is YES, the sum of the value of time information indicating a time at which the target operator in the query execution module 226 has executed processing last time and the value of the output interval of the target operator that is registered in the query execution tree graph analysis result management table 235 is registered in the next ignition time holding area 234 (1109).

When Step 1109 is finished, or when the answer to Step 1108 is NO, the next ignition time calculating module 223 determines whether or not the target operator is an operator (Sum, Count, Average, Min, Max, Median, Variable, Standard Deviation, Limit) that has a function of excluding ghosts (1110). When the answer to Step 1110 is YES, the sum of the value of time information that is attached to a tuple input to the target operator in the query execution module 226 and the value of the minimum time unit of the target operator that is registered in the query execution tree graph analysis result management table 235 is registered in the next ignition time holding area 234 (1111).

When Step 1111 is finished, or when the answer to Step 1110 is NO, Step 804 is ended (1112).

Through the processing described above, the sum of the value of time information indicating a time at which an operator in the query execution module 226 has executed processing last time and the value of time information registered in the query execution tree graph analysis result management table 235 is stored in the next ignition time holding area 234. In other words, the next ignition time holding area 234 stores a next ignition time for each operator, which is the time when the operator is to start processing next.

Figure 12:
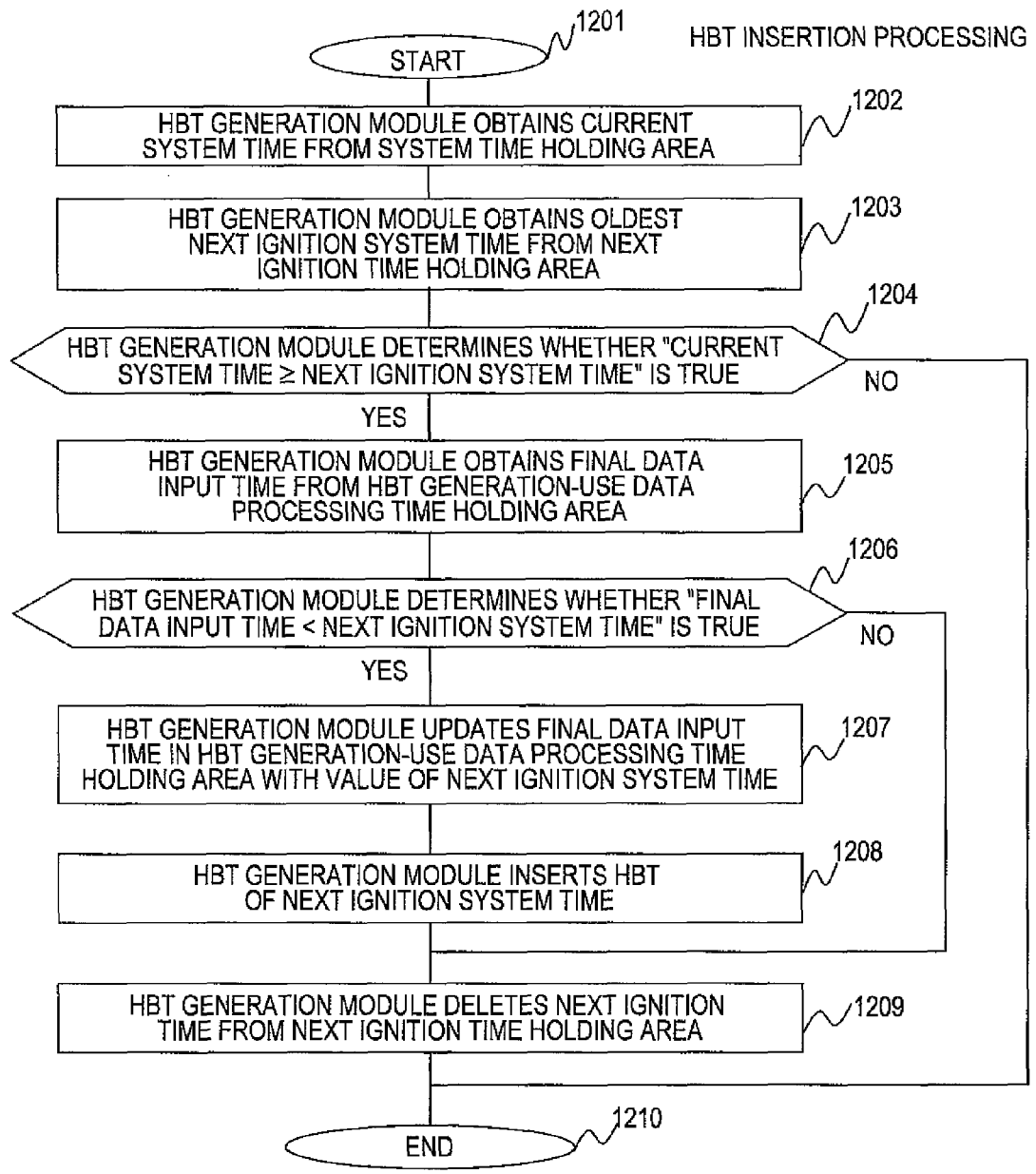
FIG. 12 shows a first embodiment of this invention, and is a flow chart illustrating the HBT insertion (or generation) processing in Step 805 of FIG. 8.

FIG. 12 is a flow chart illustrating the HBT insertion (or generation) processing in Step 805 of FIG. 8.

First, the HBT generation module 224 of FIG. 2 obtains a current system timestamp held in the system timestamp holding area 232 (1202). Next, the HBT generation module 224 obtains the oldest next ignition system time that is held in the next ignition time holding area 234 (1203). The HBT generation module 224 then compares the obtained current system timestamp against the obtained next ignition system time to determine whether or not it is true that the value of the current system timestamp is equal to or larger than the value of the next ignition system time (current system timestamp value≧next ignition system time) (1204).

When the answer to Step 1204 is YES, the HBT generation module 224 obtains a final data input time held in the HBT generation-use data processing time holding area 233. The HBT generation module 224 compares the obtained final data input time against the next ignition system time obtained in Step 1203, to thereby determine whether or not it is true that the final data input time is smaller than the next ignition system time (final data input time<next ignition system time) (1206).

When the answer to Step 1206 is YES, the HBT generation module 224 updates the final data input time held in the HBT generation-use data processing time holding area 233 with the value of the next ignition system time obtained in Step 1203 (1207). The HBT generation module 224 then transmits an HBT of this next ignition system time (1208).

When Step 1208 is finished, or when the answer to step 1206 is NO, the HBT generation module 224 deletes from the next ignition time holding area 234 the next ignition system time that has been obtained in Step 1202 (1209).

When Step 1209 is finished, or when the answer to Step 1204 is NO, Step 805 is ended (1210).

In Step 1203, the oldest next ignition system time that is held in the next ignition time holding area 234 is obtained. Alternatively, a next ignition time that is the latest among ones equal to or smaller in value than the current time may be obtained in Step 1203 and time information that is equal to or smaller in value than this next ignition time may be deleted in Step 1209.

Through the processing described above, the HBT generation module 224 transmits an HBT of a next ignition system time when a condition that the value of the current system timestamp is equal to or larger than the value of the next ignition system time while the final data input time is smaller than the next ignition system time is met. This enables the operators in the execution tree 241$_1$ of FIG. 6 to start processing without waiting for the arrival of the stream data 21.

Figure 13:
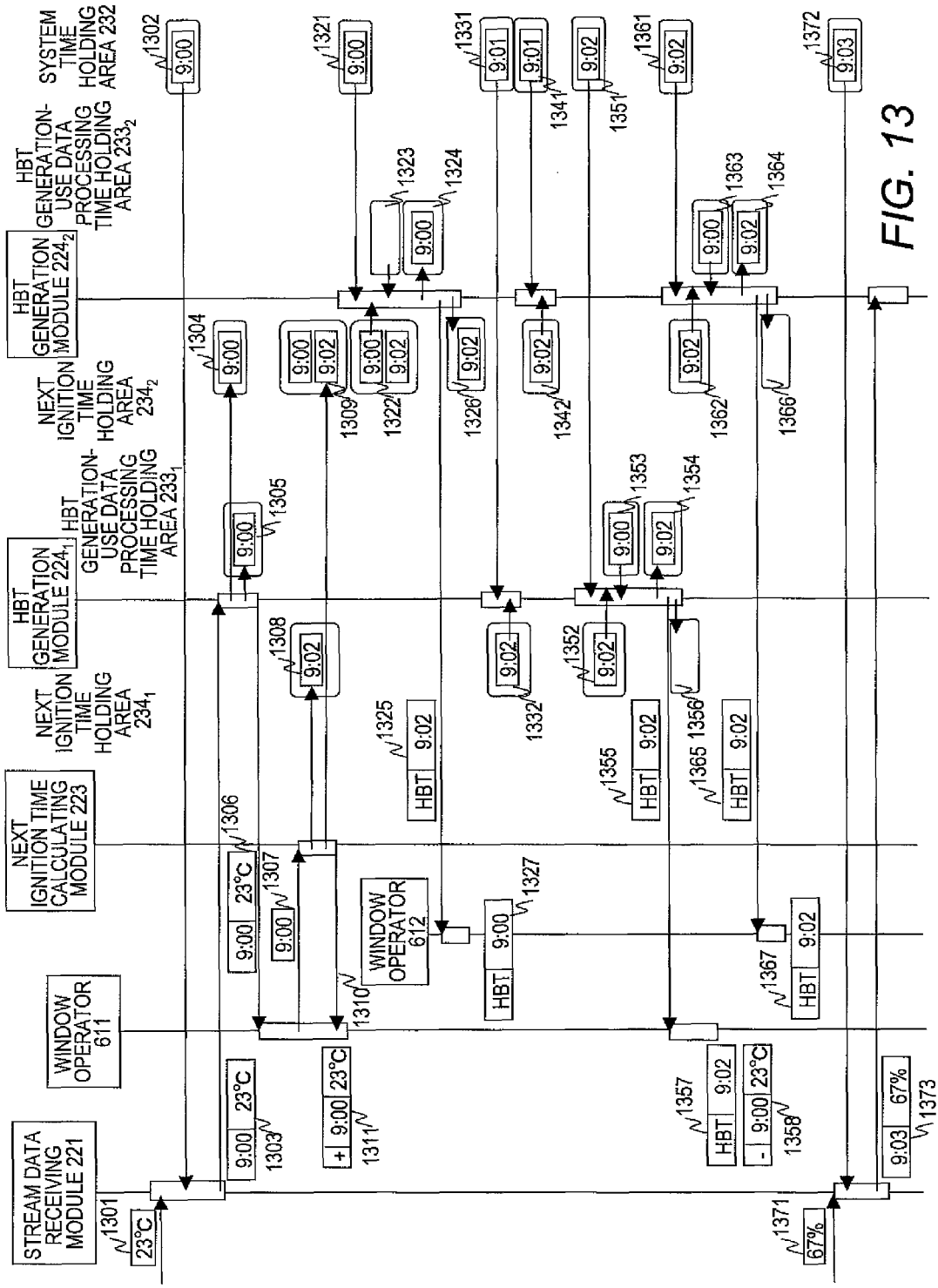
FIG. 13 shows a first embodiment of this invention, and is a sequence diagram exemplifying the next ignition time calculation processing and the HBT generation processing.

FIG. 13 is a sequence diagram exemplifying the next ignition time calculation processing and the HBT generation processing.

FIG. 13 is described with reference to the stream data receiving module 221, the HBT generation module 224$_1$, a next ignition time holding area 234$_1$, an HBT generation-use data processing time holding area 233$_1$, an HBT generation module 224$_2$, a next ignition time holding area 234$_2$, an HBT generation-use data processing time holding area 233$_2$, the window operator 611, and the window operator 612, which are illustrated in FIG. 6, and the next ignition time calculating module 223 and the system timestamp holding area 232, which are illustrated in FIG. 2. The description also uses the flow charts of FIGS. 8, 10, 11, and 12. The query execution tree scheduler 222 illustrated in FIG. 2 controls the processing execution order of the HBT generation module 224$_1$, the HBT generation module 224$_2$, the window operator 611, and the window operator 612.

First, the stream data 21$_1$ of FIG. 6 is input to the stream data receiving module 221 (1301). As illustrated in FIGS. 3 and 4, the temperature stream data 21$_1$ has a format that includes the temperature sensor ID 302, the device ID 303, and the temperature 304. In Step 1301, the temperature sensor ID 302 has a value "1001", the device ID 303 has a value "201", and the temperature 304 has a value "23° C". The format of the temperature stream data 21$_1$ in Step 1301 is simplified in the drawing, and "23° C". alone is illustrated.

Next, the stream data receiving module 221 obtains a current time "9:00" held in the system timestamp holding area 232 (1302), stores "9:00" as the value of the system timestamp 305, and transmits the stream data 21$_1$ to the HBT generation module 224$_1$ (1303).

Following the flow chart of FIG. 10, the HBT generation module 224$_1$ registers the input time information "9:00" of the received stream data 21$_1$ in the next ignition time holding area 234 of the HBT generation module 224 that is not the HBT generation module 224$_1$ which has been given YES as the answer to Step 1002 and which has received a tuple "9:00, 23° C". of the stream data 21$_1$ in Step 1003, namely, the next ignition time holding area 234$_2$ of the HBT generation module 224$_2$ (1304). The HBT generation module 224$_1$ next updates the final data input time of the HBT generation-use data processing time holding area 233$_1$ with the value "9:00" of the input time information of the received stream data 21$_1$ (1305), and transmits the tuple "9:00, 23° C". to the window operator 611 (1306).

The window operator 611 executes processing unique to the window operator 611, and then executes processing of calculating a next ignition time. The flow chart of FIG. 11 is followed and YES is given as the answer to Step 1102, and hence a value "9:02" is registered in the next ignition time holding area 234$_1$ and in the next ignition time holding area 234$_2$, as the sum of the value of the time information "9:00" attached to the tuple "9:00, 23° C". which has been input to the window operator 611 and the value of the sliding window size "2 minutes" registered in the row 704 of the query execution tree graph analysis result management table 235 of FIG. 7 (1308, 1309). In the next ignition time holding area 234$_2$, the registration of the value "9:02" is an addition as opposed to overwrite, thus changing the time information stored in the next ignition time holding area 234$_2$ to "9:00, 9:02". Then, the answer is NO in all of Steps 1104, 1106, 1108, and 1110, and the processing is ended. The window operator 611 also attaches to the tuple a plus flag indicating that the tuple has become a processing target, and transmits the resultant tuple "+, 9:03, 23° C". to the filter operator 613 of FIG. 6 (stores the tuple in the operator joining queue 236 that links the window operator 611 with the filter operator 613) (1311).

Following the flow chart of FIG. 12, the HBT generation module 224$_2$ obtains in Step 1202 the current system timestamp "9:00" held in the system timestamp holding area 232 (1321), and obtains in Step 1203 the oldest next ignition system time "9:00" held in the next ignition time holding area 234$_2$ (1322). In Step 1204, the answer is YES because the relation "current system timestamp "9:00"≧next ignition system time "9:00"" is satisfied, and a final data input time "–(no data is stored because an update has not been made)" of the HBT generation-use data processing time holding area 233$_2$ is obtained in Step 1205 (1323). In Step 1206, the answer is YES because the relation "final data input time "–(no data is stored because an update has not been made)"<next ignition system time "9:00"" is satisfied, and the final data input time held in the HBT generation-use data processing time holding area 233$_2$ is updated in Step 1207 with the next ignition system time "9:00" obtained in Step 1322 (1324). In Step 1208, an HBT "HBT, 9:00" of the next ignition system time "9:00" obtained in Step 1322 is transmitted to the window operator 612 (1325). In Step 1209, the next ignition system time "9:00" obtained in Step 1322 is deleted from the next ignition time holding area 234$_2$ (1326). The window operator 612, which is a group-based row window operator (Partitioned window), does not execute any processing upon reception of the HBT "HBT, 9:00", and transmits the HBT "HBT, 9:00" to the filter operator 614 (stores the HBT in the operator joining queue 236 that links the window operator 612 with the filter operator 614) (1327).

Following the flow chart of FIG. 12, the HBT generation module $224_1$ obtains in Step 1202 a current system timestamp "9:01" held in the system timestamp holding area 232 (1331), and obtains in Step 1203 the oldest next ignition system time "9:02" held in the next ignition time holding area $234_1$ (1332). In Step 1204, the answer is NO because the relation "current system time "9:01"≧next system ignition time "9:02"" is not satisfied, and the processing is ended.

Similarly, following the flow chart of FIG. 12, the HBT generation module $224_2$ obtains in Step 1202 a current system timestamp "9:01" held in the system timestamp holding area 232 (1341), and obtains in Step 1203 the oldest next ignition system time "9:02" held in the next ignition time holding area $234_1$ (1342). In Step 1204, the answer is NO because the relation "current system time "9:01"≧next system ignition time "9:02"" is not satisfied, and the processing is ended.

Following the flow chart of FIG. 12, the HBT generation module $224_1$ obtains in Step 1202 the current system timestamp "9:02" held in the system timestamp holding area 232 (1351), and obtains in Step 1203 the oldest next ignition system time "9:02" held in the next ignition time holding area $234_1$ (1352). In Step 1204, the answer is YES because the relation "current system timestamp "9:02"≧next ignition system time "9:02"" is satisfied, and a final data input time "9:00" of the HBT generation-use data processing time holding area $233_1$ is obtained in Step 1205 (1353). In Step 1206, the answer is YES because the relation "final data input time "9:00"" <next ignition system time "9:02"" is satisfied, and the final data input time held in the HBT generation-use data processing time holding area $233_1$ is updated in Step 1207 with the next ignition system time "9:02" obtained in Step 1352 (1354). In Step 1208, an HBT "HBT, 9:02" of the next ignition system time "9:02" obtained in Step 1352 is transmitted to the window operator 611 (1355). In Step 1209, the next ignition system time "9:02" obtained in Step 1352 is deleted from the next ignition time holding area $234_1$ (1356). The window operator 611 transmits the HBT "HBT, 9:02" to the filter operator 613 of FIG. 6 (stores the HBT in the operator joining queue 236 that links the window operator 611 with the filter operator 613) (1357). The HBT "HBT, 9:02" pushes the tuple "+, 9:00, 23° C". transmitted in Step 1311 out of its processing target status (the tuple of 9:00 ceases to be a processing target at 9:02 due to the "Range 2 minutes" definition). A minus flag (−) indicating that a tuple is no longer a processing target is attached to the tuple, and the resultant tuple "−, 9:00, 23° C". is transmitted to the filter operator 613 of FIG. 6 (the tuple is stored in the operator joining queue 236 that links the window operator 612 with the filter operator 613) (1358).

Similarly, following the flow chart of FIG. 12, the HBT generation module $224_2$ obtains in Step 1202 the current system timestamp "9:02" held in the system timestamp holding area 232 (1361), and obtains in Step 1203 the oldest next ignition system time "9:02" held in the next ignition time holding area $234_2$ (1362). In Step 1204, the answer is YES because the relation "current system timestamp "9:02"≧next ignition system time "9:02"" is satisfied, and a final data input time "9:00" of the HBT generation-use data processing time holding area $233_2$ is obtained in Step 1205 (1363). In Step 1206, the answer is YES because the relation "final data input time "9:00"<next ignition system time "9:02"" is satisfied, and the final data input time held in the HBT generation-use data processing time holding area $233_2$ is updated in Step 1207 with the next ignition system time "9:02" obtained in Step 1362 (1364). In Step 1208, the HBT "HBT, 9:02" of the next ignition system time "9:02" obtained in Step 1362 is transmitted to the window operator 612 (1365). In Step 1209, the next ignition system time "9:02" obtained in Step 1362 is deleted from the next ignition time holding area $234_2$ (1366). The window operator 612 transmits the HBT "HBT, 9:02" to the filter operator 614 of FIG. 6 (stores the HBT in the operator joining queue 236 that links the window operator 612 with the filter operator 614) (1367). The reception of the HBT "HBT, 9:02" at the window operator 612 does not cause a switch to another processing target.

Next, the stream data $21_2$ of FIG. 6 is input to the stream data receiving module 221 (1371). The humidity stream data $21_2$ has a format that includes the humidity sensor ID 312, the device ID 313, and the humidity 314 as illustrated in FIGS. 3B and 4. In Step 1371, the humidity sensor ID 312 has a value "2001", the device ID 313 has a value "201", and the humidity 304 has a value "67%". The format of the humidity stream data $21_2$ in Step 1371 is simplified in the drawing, and "67%" alone is illustrated.

Next, the stream data receiving module 221 obtains a current time "9:03" held in the system timestamp holding area 232 (1372), stores "9:03" as the value of the system timestamp 315, and transmits the stream data $21_2$ to the HBT generation module $224_2$ (1373).

Subsequently, the same processing is repeated.

Summary of the First Embodiment

In a stream data processing method where part of stream data is defined as a processing target by a window and an HBT which indicates the advance of time is inserted (generated and added) to the stream data, time information of the received stream data is stored in a next ignition time holding area as a next ignition time, which is a time when the HBT is inserted by an HBT generation module for generating the HBT. A processing module that generates the HBT at a time different from the time of reception of the stream data is extracted out of a query that indicates how the stream data is to be processed. Based on the extracted processing module and the time information indicating the time of reception of the stream data, the next ignition time is calculated and stored in the next ignition time holding area. The HBT generation module generates the HBT at the ignition time held in the next ignition time holding area. The first embodiment has described that inserting time control information at the time when it is necessary, which is an object of this invention, is accomplished through the processing described above.

As described above, in the processing according to this invention which is capable of inserting time control information at the time when it is necessary, the amount of time control information is correspondingly reduced. At the same time, the stream data processing is small in latency because time control information is inserted at the timing when a processing module needs time control information.

The first embodiment of this invention has been described above.

This invention is not limited to the first embodiment described above, and various kinds of modifications may be made within the scope of the gist of this invention. As described hereinbelow, the same or further effects may be obtained by embodiments different from the first embodiment, or further effects may be obtained by combining the embodiments with the first embodiment.

To give an example, in the flow chart of FIG. 9 and the sequence diagram of FIG. 13 exemplifying the next ignition time calculation processing and the HBT generation processing, a next ignition time is stored in every next ignition time holding area. Not all of the next ignition time holding areas need to store a next ignition time if whether or not a specific next ignition time holding area is to store a next ignition time is determined as illustrated in a flow chart of FIG. 14.

Figure 14:
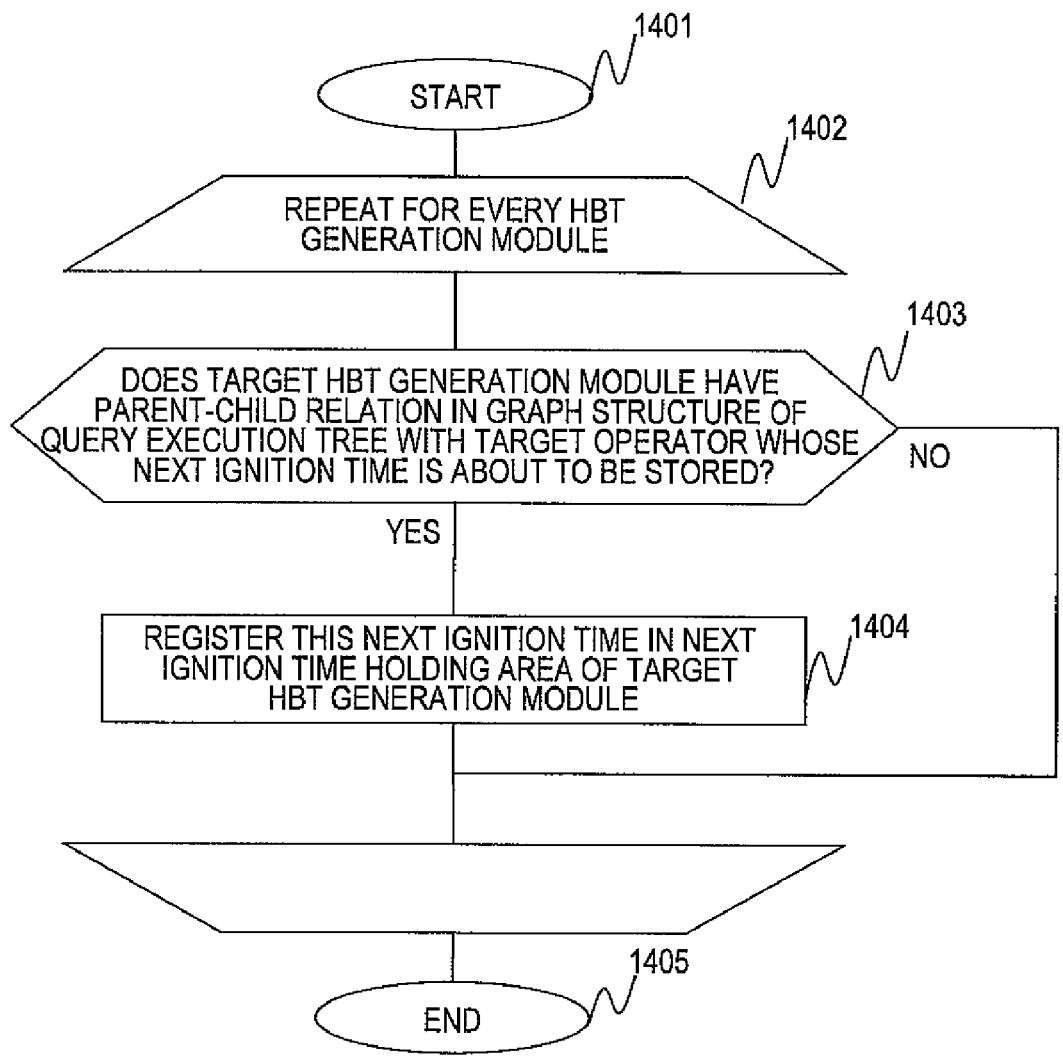
FIG. 14 shows a first embodiment of this invention, and is a flow chart of storing a next ignition time in a next ignition time holding area.

The flow chart of FIG. 14 is described below.

The stream data processing module 220 repeats the following processing for every HBT generation module 224$_n$ (1402).

When the answer to Step 1403 is YES in the previous round, whether or not the target HBT generation module 224$_n$ has a parent-child relation in the graph structure of the execution tree with the target operator whose next ignition time is about to be stored is determined (1403). Whether or not there is a parent-child relation is determined by whether or not two target operators are along a path on which the stream data 21 travels through the execution tree 241$_1$ of FIG. 6. In the case of the join operator 615 or other operators that handle two or more inputs of stream data, the output side operator has a parent-child relation with an operator of any one of the input side operators. For example, the aggregation operator 616 and the HBT generation module 224$_1$ are in a parent-child relation in FIG. 6.

When Step 1404 is finished, or when the answer to Step 1403 is NO, the next ignition time is registered in the next ignition time holding area 234$_n$ of the target HBT generation module 224$_n$ (1404). When Steps 1403 and 1404 have been executed for every HBT generation module 224$_n$, the processing is ended (1405).

In the flow chart of FIG. 14, whether to store a next ignition time in a next ignition time holding area is determined when the next ignition time is about to be stored. Alternatively, the target operator may determine which next ignition time holding area is to store a next ignition time and store the decision in a table in advance, and hence the table is referred to when necessary.

Second Embodiment

A second embodiment of this invention is described below.

The first embodiment has described that a wait in the query execution module 226 may be solved in the stream data processing sever 100 by making the HBT generation module 224 generate an HBT for advancing time during a period in which no data is generated at the time when the HBT is needed.

The second embodiment discusses a case in which a plurality of computers are involved and time information in a first computer is used to execute stream data processing in a second computer. In this case, too, a problem similar to the wait problem of the query execution module 226 described above arises due to the need to transmit the time information in the first computer to the second computer.

The second embodiment is characterized in that, in a setting in which contains a plurality of computers are involved and time information in a first computer is used to execute stream data processing in a second computer, the time information in the first computer is transmitted to the second computer at the time when time control information is needed. The time control information in the second embodiment is discriminated from an HBT used within the query execution module 226, and is called a system timestamp tuple (STT). The STT has a format similar to that of the HBT, and includes an STT flag, which indicates that it is an STT, and time information, which indicates the time of generation of the STT. The STT may have other formats.

The second computer calculates a next ignition time in the manner described in the first embodiment, and transmits the calculated next ignition time to the first computer. Based on the next ignition time, the first computer transmits an STT to the second computer. The second computer may use the processing method described in the first embodiment or any other arbitrary method to execute a query. For example, the second computer may execute a query without using an HBT.

Figure 15:
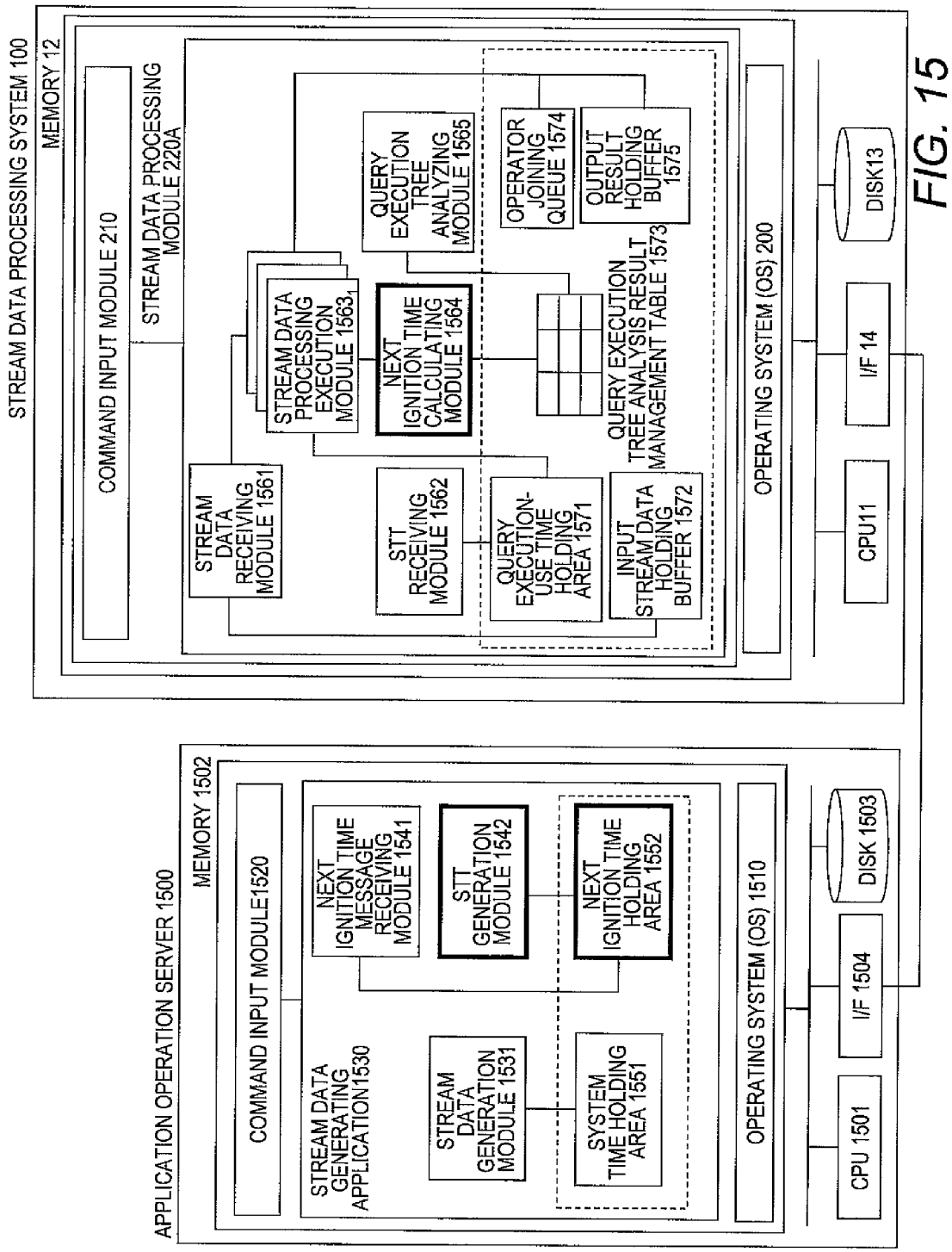
FIG. 15 is a block diagram illustrating a configuration of the stream data processing system to which the second embodiment of this invention is applied and the system components related thereto.

FIG. 15 is a block diagram illustrating a configuration of the stream data processing system to which the second embodiment of this invention is applied and the system components related thereto.

The stream data processing sever 100 of FIG. 15 is the same as the stream data processing sever 100 of FIG. 1, and includes the CPU 11, the memory 12, the DISK 13, and the I/F 14. The memory 12 includes the operating system (OS) 200, the command input module 210, and a stream data processing module 220A. The operating system (OS) 200 and the command input module 210 of FIG. 15 are the same as the operating system (OS) 200 and the command input module 210 of FIG. 2. The stream data processing module 220A of the stream data processing sever 100 is obtained by removing the system timestamp holding area and the next ignition time holding area from the stream data processing module 220 of the first embodiment, and adding an STT receiving module 1562.

An application operation server 1500 includes a CPU 1501, a memory 1502, a DISK 1503, and an I/F 1504. The memory 1502 includes an operating system (OS) 1510, a command input module 1520, and a stream data generating application 1530. The stream data processing sever 100 and the application operation server 1500 are connected to the network 112 illustrated in FIG. 1 via the I/F 14 and the I/F 1504, respectively.

The second embodiment of this invention is outlined with reference to FIG. 15. The application operation server 1500 generates the stream data 21, attaches time information held by the application operation server 1500 to the generated stream data 21, and transmits the stream data 21 to the stream data processing sever 100. The stream data processing sever 100 reads the stream data 21 according to a query given from the user 114 through the computer 115, or a query that is input from an application run on the computer 115. The stream data processing sever 100 converts the read stream data into significant information based on the time information held by the application operation server 1500, and then outputs the output result 23. Significant information is, for example, information that is converted into a value averaged over a given period of time, because measured values of the temperature sensor node 101 of FIG. 1 are in the form of a data sequence of measured values which is incomprehensible to the users 114 and 116.

The configuration of the stream data processing sever 100 is described in detail below.

The stream data processing module 220A includes a stream data receiving module 1561, the STT receiving module 1562, a stream data processing execution module 1563, a next ignition time calculating module 1564, a query execution tree graph analyzing module 1565, a query execution-use time holding area 1571, an input stream data holding buffer 1572, a query execution tree analysis result management table 1573, an operator joining queue 1574, and an output result holding buffer 1575.

The input stream data holding buffer 1572 is the same as the input stream data holding buffer 231.

The stream data receiving module 1561 obtains data from the input stream data holding buffer 1572, and outputs the data to the stream data processing execution module 1563. In this embodiment where data is processed based on time information that is attached to the data by the application operation server 1500, the current time of the system held by the stream data processing sever 100 is not used.

The stream data processing execution module 1563 processes the stream data 21 based on time information that is attached to the stream data 21 by the application operation server 1500. Any processing method may be employed. For example, the stream data processing execution module 1563 may be a processing module that is a combination of the query execution module 226, the query execution tree scheduler 222, and the HBT generation module 224, which are illustrated in FIG. 2. In this embodiment, operators as those in the query execution module 226, including window operation, filter operation, projection operation, join operation, and aggregation operation are arranged in a tree structure (execution tree). The stream data processing execution module 1563 receives data output from the stream data receiving module 1561, and stores a result of processing executed respectively by operators in an execution tree in the output result holding buffer 1575. Midway results of processing executed respectively by the operators are stored in the operator joining queue 1574.

The operator joining queue 1574 and the output result holding buffer 1575 are the same as the operator joining queue 236 and the output result holding buffer 237, respectively. The query execution tree analyzing module 1565 and the query execution tree analysis result management table 1573 are the same as the query execution tree analyzing module 225 and the query execution tree analysis result management table 235, respectively.

The next ignition time calculating module 1564 refers to the query execution tree analysis result management table 1573 to calculate a next ignition time based on time information of input stream data and settings information of the query which is stored in the query execution tree analysis result management table 1573, and transmits the calculated next ignition time to the application operation server 1500 via the I/F 14 as a next ignition time message. The next ignition time calculating module 1564 is called up when the stream data processing execution module 1563 executes an operator extracted by the query execution tree analyzing module 1565.

The STT receiving module 1562 receives via the I/F 14 an STT transmitted from an STT generation module 1542 of the application operation server 1500 which is described later. The STT receiving module 1562 holds time information attached to the received STT in the query execution-use time holding area 1571. The query execution-use time holding area 1571 is a area where time information transmitted from the application operation server 1500 is held. Based on this time information, the stream data processing execution module 1563 executes a query.

The configuration of the application operation server 1500 is described next in detail.

The command input module 1520 receives a command given from the user 114 through the computer 115, or a command that is input from an application run on the computer 115.

The stream data generating application 1530 includes a stream data generation module 1531, a next ignition time message receiving module 1541, the STT generation module 1542, a system timestamp holding area 1551, and a next ignition time holding area 1552.

The system timestamp holding area 1551 is a area where the current time of the system is held. The current time of the system in this embodiment is absolute time information (e.g., current time managed by the OS 1510) that the application operation server 1500 has. Alternatively, the current time of the system may be a value updated with time information that is input from another computer.

The stream data generation module 1531 generates the stream data 21, attaches the current time of the system which is held in the system timestamp holding area 1551 to the generated stream data 21, and transmits the stream data 21 to the stream data processing sever 100 via the I/F 1504.

The next ignition time message receiving module 1541 receives via the I/F 1504 a next ignition time message transmitted from the next ignition time calculating module 1564 of the application operation server 1500, and stores time information attached to the next ignition time message in the next ignition time holding area 1552. The next ignition time holding area 1552 is a area in which a next ignition time attached to the next ignition time message that is received by the next ignition time message receiving module 1541 is held.

The STT generation module 1542 refers to the system timestamp holding area 1551 and the next ignition time holding area 1552. Using the current time of the system which is held in the system timestamp holding area 1551 and the next ignition time which is held in the next ignition time holding area 1552, the STT generation module 1542 transmits the STT via the I/F 1504 to the stream data processing sever 100 at the ignition time. Details of this process are described later.

The stream data 21, the output result 23, next ignition time messages, STTs, and temporarily stored data, which is kept by an operator for processing, may have any data format including the tuple format (record format), the XML format, and the CSV file format. The tuple format is used in the example given below. The stream data 21, the output result 23, the next ignition time messages, the STTs, and the temporarily stored data, which is kept by an operator for processing, do not need to be actual data, and may include partially or entirely a pointer that points to the actual data.

The application operation server 1500 may be a server that executes stream data processing. For example, the stream data generation module 1531 may be the stream data processing module 220A illustrated in FIG. 15. Then stream data processing may be divided between the first computer and the second computer such that time information on which stream data processing is performed by the first computer is used in stream data processing executed by the second computer.

Figure 16:
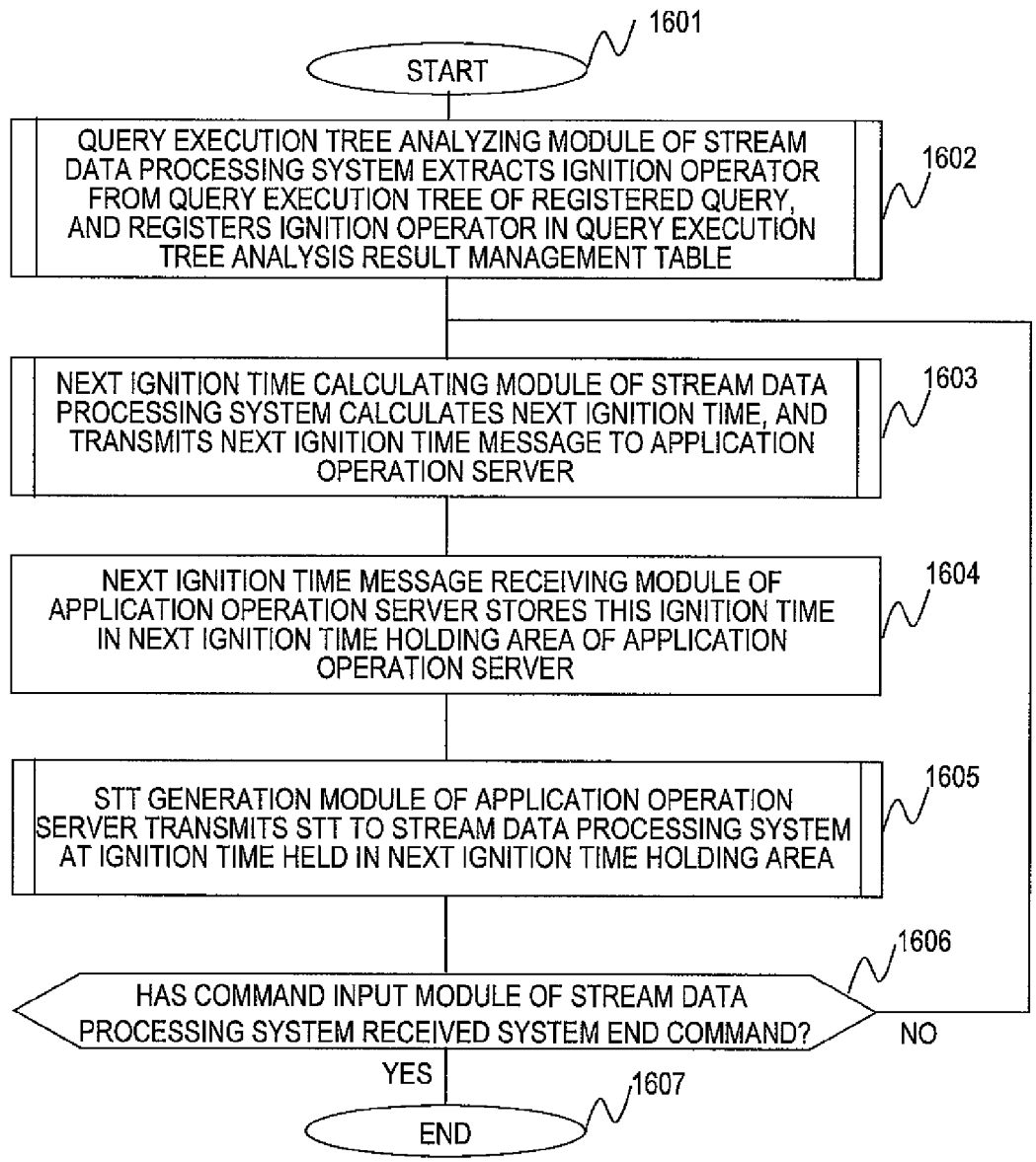
FIG. 16 shows a second embodiment of this invention, and is a flow chart illustrating overall processing of the stream data processing sever 100 and the application operation server 1500.

FIG. 16 is a flow chart illustrating overall processing of the stream data processing sever 100 and the application operation server 1500.

First, the query execution tree analyzing module 1565 of the stream data processing sever 100 illustrated in FIG. 15 extracts an ignition operator from a query execution tree of a registered query, and registers the ignition operator in the query execution tree analysis result management table 1573 (1602). Details of Step 1602 are the same as in the flow chart of FIG. 9.

Next, the next ignition time calculating module 1564 of the stream data processing sever 100 calculates a next ignition time and transmits a next ignition time message to the application operation server 1500 (1603). Details of Step 1603 are described later with reference to FIG. 17.

Next, the next ignition time message receiving module 1541 of the application operation server 1500 receives the next ignition time message, and stores the next ignition time in the next ignition time holding area 1552 of the application operation server 1500 (1604).

Next, the STT generation module 1542 of the application operation server 1500 transmits an STT to the stream data processing sever 100 at the ignition time held in the next ignition time holding area 1552 (1605). Details of Step 1605 are described later with reference to FIG. 18.

Next, whether or not the command input module 210 of the stream data processing sever 100 has received a system end command is determined (1606). When the answer to Step 1606 is NO, the processing returns to Step 1602. When the answer to Step 1606 is YES, the processing of the stream data processing sever 100 is ended (1607).

Figure 17:
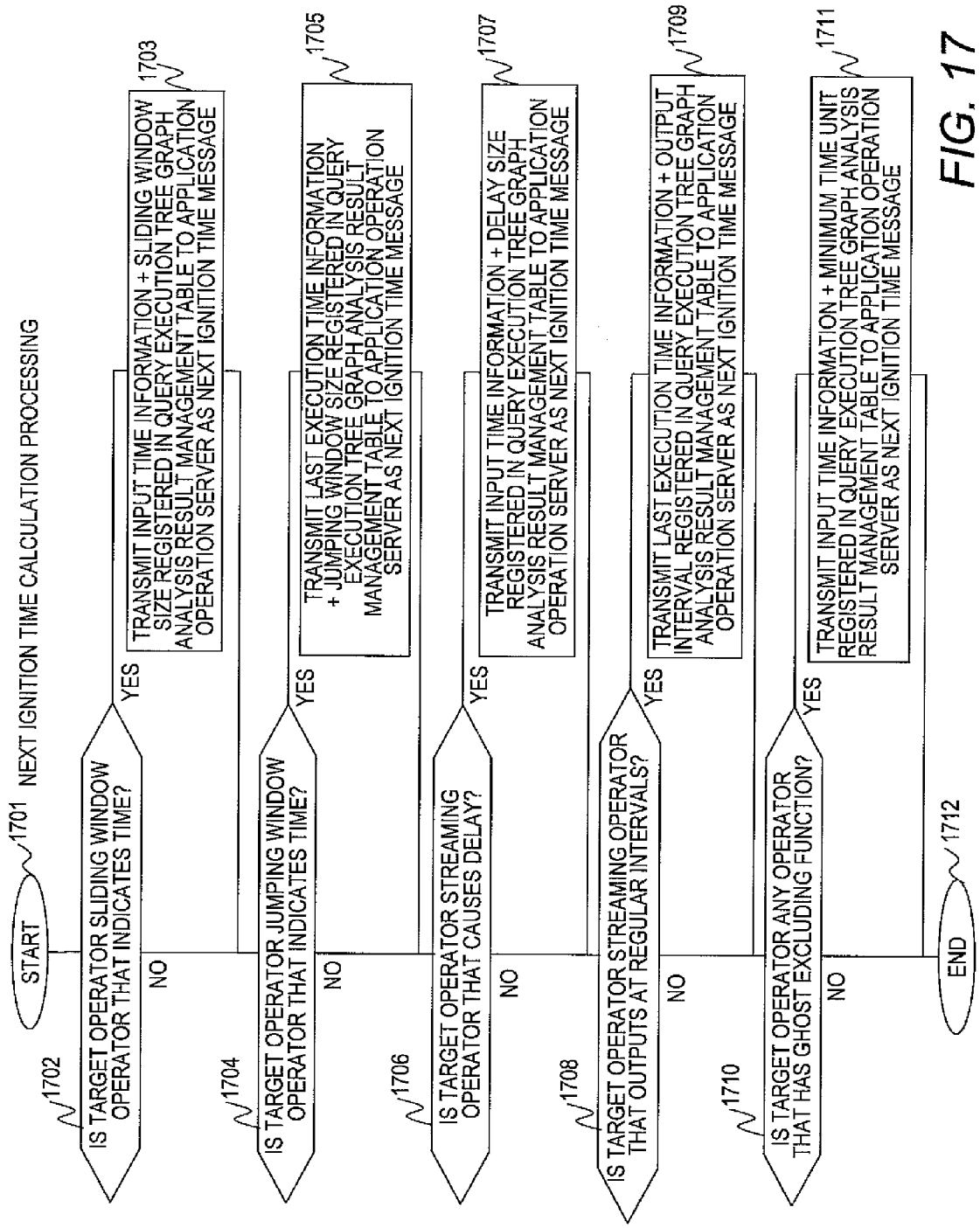
FIG. 17 shows a second embodiment of this invention, and is a flow chart illustrating the next ignition time calculation processing in Step 1603 of FIG. 16.

FIG. 17 is a flow chart illustrating the next ignition time calculation processing in Step 1603 of FIG. 16.

First, the next ignition time calculating module 1564 of the stream data processing sever 100 determines whether or not the target operator is a sliding window operator (Range Window) that indicates a time period (1702). When the answer to Step 1702 is YES, the next ignition time calculating module 1564 transmits the sum of the value of the time information that is attached to a tuple input to the target operator in the stream data processing execution module 1563 of FIG. 15 and the value of the sliding window size of the target operator that is registered in the query execution tree graph analysis result management table 1573 to the application operation server 1500 as a next ignition time message (1703).

When Step 1703 is finished, or when the answer to Step 1702 is NO, the next ignition time calculating module 1564 determines whether or not the target operator is jumping window operator (Jumping Window) that indicates a time period (1704). When the answer to Step 1704 is YES, the next ignition time calculating module 1564 transmits the sum of the value of the time information indicating a time at which the target operator in the stream data processing execution module 1563 has executed processing last time and the value of the jumping window size that is registered in the query execution tree graph analysis result management table 1573 to the application operation server 1500 as a next ignition time message (1705).

When Step 1705 is finished, or when the answer to Step 1704 is NO, the next ignition time calculating module 1564 determines whether or not the target operator is a relation-to-stream operator (IStream, DStream, IDStream) that indicates a time period and that causes delay (1706). When the answer to Step 1706 is YES, the next ignition time calculating module 1564 transmits the sum of the value of the time information that is attached to a tuple input to the target operator in the stream data processing execution module 1563 and the value of the delay size that is registered in the query execution tree graph analysis result management table 1573 to the application operation server 1500 as a next ignition time message (1707).

When Step 1707 is finished, or when the answer to Step 1706 is NO, the next ignition time calculating module 1564 determines whether or not the target operator is a relation-to-stream operator (RStream) that indicates a time period and that outputs at regular intervals (1708). When the answer to Step 1708 is YES, the next ignition time calculating module 1564 transmits the sum of the value of the time information indicating a time at which the target operator in the stream data processing execution module 1563 has executed processing last time and the value of the output interval of the target operator that is registered in the query execution tree graph analysis result management table 1573 to the application operation server 1500 as a next ignition time message (1709).

When Step 1709 is finished, or when the answer to Step 1708 is NO, the next ignition time calculating module 1564 determines whether or not the target operator is an operator (Sum, Count, Average, Min, Max, Median, Variable, Standard Deviation, Limit) that has a function of excluding ghosts (1710). When the answer to Step 1710 is YES, the next ignition time calculating module 1564 transmits the sum of the value of the time information that is attached to a tuple input to the target operator in the stream data processing execution module 1563 and the value of the minimum time unit of the target operator that is registered in the query execution tree graph analysis result management table 1573 to the application operation server 1500 as a next ignition time message (1711).

When Step 1711 is finished, or when the answer to Step 1710 is NO, Step 1603 is ended (1712).

Through the processing described above, a next ignition time of an ignition operator is calculated based on the sum of time information that is attached to a tuple input to the target operator and time information that is registered in the query execution tree graph analysis result management table 1573, and the calculated next ignition time is transmitted as a next ignition time message to the application operation server 1500.

Figure 18:
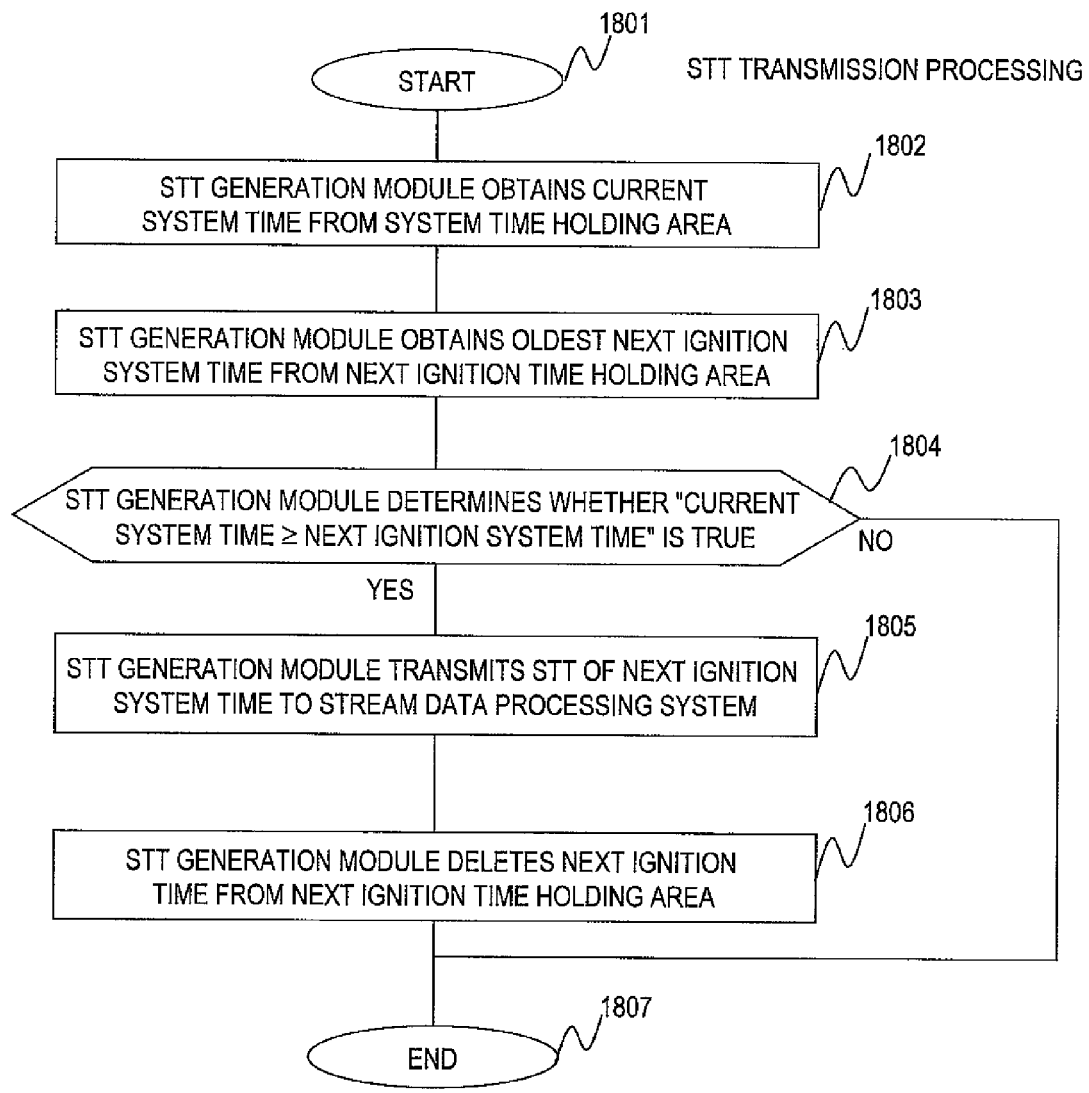
FIG. 18 shows a second embodiment of this invention, and is a flow chart illustrating the processing that is executed by the STT generation module 1542 of the application operation server 1500 in Step 1605 of FIG. 16.

FIG. 18 is a flow chart illustrating the processing that is executed by the STT generation module 1542 of the application operation server 1500 in Step 1605 of FIG. 16.

First, the STT generation module 1542 of FIG. 15 obtains a current system timestamp held in the system timestamp holding area 1551 (1802). Next, the STT generation module 1542 obtains the oldest next ignition system time that is held in the next ignition time holding area 1551 (1803). The STT generation module 1542 then compares the obtained current system timestamp against the obtained next ignition system time to determine whether it is true that the value of the current system time stamp is equal to or larger than the value of the next ignition system time (current system timestamp value≧next ignition system time) (1804).

When the answer to Step 1804 is YES, the STT generation module 1542 transmits an STT of the next ignition system time (1805). The STT generation module 1542 then deletes the next ignition system time obtained in Step 1802 from the next ignition time holding area 1551 (1806).

When Step 1806 is finished, or when the answer to Step 1804 is NO, Step 1605 is ended (1807).

In Step 1803, the oldest next ignition system time that is held in the next ignition time holding area 1551 is obtained. Alternatively, a next ignition time that is the latest among ones equal to or smaller than the value of the current time may be obtained in Step 1803 and time information that is equal to or smaller than the value of this next ignition time may be deleted in Step 1806.

The second embodiment of this invention has been described above.

CONCLUSION

This invention is not limited to the first and second embodiments described above, and various kinds of modifications may be made within the scope of the gist of this invention. In addition, any combination of the first and second embodiments described above may be made.

For example, in the above embodiments, no limitation is placed on a size of the data to be held in the next ignition time holding area illustrated in FIGS. 2 and 15. However, by defining a memory upper limit value, an appropriate processing may be performed when the upper limit value is exceeded. For example, deleting data that has old time information, or suspending input stream data, or deleting and processing (shredding) part of input stream data may be employed.

In the embodiments described above, the next ignition time calculating module and the query execution tree analyzing module are contained within the stream data processing sever 100. Alternatively, other computers than the stream data processing sever 100 may execute the processing of the next ignition time calculating module and the query execution tree analyzing module.

While the embodiments described above are examples in which the stream data processing system processes time control information (HBT and STT), other systems than the stream data processing system such as a database system may process the time control information of the embodiments described above.

In addition, in the above embodiments, the stream data processing sever 100 and the application operation server 1500 is described as an arbitrary computer system, but a part or all of the processings performed in the stream data processing sever 100 and the application operation server 1500 may be performed in the storage system.

In addition, the above embodiments have been made by taking an example where the sensor base station 108 inputs the temperature data or humidity data to the stream data processing sever 100 as the stream data 21, but this invention is not limited thereto. For example, instead of the sensor base station 108, a sensor net server for managing a large number of sensor nodes may output measurement values from the sensor nodes as the stream data 21, and the stream data processing sever 100 may convert the measurement values into the output result 23 including the significant information that may be understood by the user 116 and provide the output result 23 to the computer 117. In addition, the data input to the stream data processing sever 100 may include tag information read by an RFID reader and a data input from the computer 113 serving as an RFID middleware system for centrally managing RFIDs. In addition, the data may include data input from the stock information providing server 118. In addition, the data input to the stream data processing sever 100 may include traffic information such as obtained from an ETC system, IC card information such as obtained from automatic ticket gates and credit cards, financial information such as information on stock prices, manufacturing process management information, call information, a system log, network access information, traceability individual body information, monitor video metadata, and a Web click stream.

As has been described, according to this invention, stream data processing small in latency is accomplished while reducing the amount of time control information by inserting (or generating) time control information at the time when the time control information is needed. In particular, this invention may be applied to a financial application, a traffic information system, a traceability system, a sensor monitoring system, computer system management, and the like, which handle an enormous amount of stream data necessary to be processed in real time.

While the present invention has been described in detail and pictorially in the accompanying drawings, the present invention is not limited to such detail but covers various obvious modifications and equivalent arrangements, which fall within the purview of the appended claims.

What is claimed is:

1. A machine-readable medium for storing a stream data processing program for receiving, as primary information, stream data input to a computer comprising a processor and a storage system, creating secondary information by obtaining a given period of the received primary information as a processing target, and generating time control information indicating advance of time in addition to the primary information, wherein the stream data processing program controls the computer to execute the procedures of:
receiving the input stream data as the primary information;
calculating, by a time control information generation module for generating, as the time control information, time information at a time of reception of the primary information, a time at which the time control information is generated as a next ignition time, and storing the next ignition time in a next ignition time holding area, which is set in the storage system;
generating the time control information when current time information reaches the next ignition time held in the next ignition time holding area; and
creating, upon reception of the generated time control information, secondary information by obtaining the given period of the received primary information as the processing target.

2. The machine-readable medium for storing a stream data processing program according to claim 1,
wherein the stream data processing program further controls the computer to execute the procedures of:
receiving and registering a query which defines processing specifics for creating the secondary information by obtaining the primary information; and
creating a processing module for executing the processing specifics defined in the received query, and
wherein the procedure of calculating, by the time control information generation module for generating, as the time control information, the time information at the time of the reception of the primary information, the time at which the time control information is generated as the next ignition time, and storing the next ignition time in the next ignition time holding area, which is set in the storage system, comprises the procedures of:
extracting a processing module that needs to generate the time control information at a time different from the time of the reception of the primary information; and
calculating the next ignition time based on the extracted processing module and based on the time information at the time of the reception of the primary information.

3. The machine-readable medium for storing a stream data processing program according to claim 2,
wherein the procedure of calculating, by the time control information generation module for generating, as the time control information, the time information at the time of the reception of the primary information, the time at which the time control information is generated as the next ignition time, and storing the next ignition time in the next ignition time holding area, which is set in the storage system, comprises a procedure of creating a plurality of the time control information generation modules which are connected to the processing module and generate the time control information, and
wherein the procedure of calculating the time at which the time control information is generated as the next ignition time, and storing the next ignition time in the next ignition time holding area, which is set in the storage system, comprises the procedures of:
determining whether or not one of the plurality of the time control information generation modules has received the primary information;
storing the time information of the received primary information in the next ignition time holding area of another one of the plurality of the time control information generation modules which is different from the one of the plurality of the time control information generation modules that has received the primary information; and storing the time information of the received primary information in a time control information generation-use data processing time holding area for storing the time information processed by the plurality of the time control information generation modules.

4. The machine-readable medium for storing a stream data processing program according to claim 3, wherein the procedure of generating the time control information when the current time information reaches the next ignition time held in the next ignition time holding area comprises the procedures of:

obtaining a current time from a system timestamp holding area, which holds a current time of the computer;
obtaining the next ignition time held in the next ignition time holding area;
determining whether or not the obtained current time is equal to or larger than the next ignition time;
obtaining, when the obtained current time is equal to or larger than the next ignition time, a final data input time from the time control information generation-use data processing time holding area, where a final time at which the primary information has been input to the time control information generation module is held;
determining whether or not the obtained final data input time is smaller than the next ignition time;
updating, when the obtained final data input time is smaller than the next ignition time, the final data input time held in the time control information generation-use data processing time holding area;
generating time control information at the next ignition time; and
deleting, when the obtained final data input time is equal to or larger than the next ignition time, the next ignition time from the next ignition time holding area.

5. The machine-readable medium for storing a stream data processing program according to claim 2, wherein the procedure of extracting the processing module that needs to generate the time control information at the time different from the time of the reception of the primary information comprises:

a first procedure of determining whether or not the processing module is a processing module that performs, on the primary information, sliding window operation in which a processing target range indicated by a time window that is specified in the query is cut out, and registering, when the processing module is determined as the processing module that performs the sliding window operation, the processing module and a time size in a query execution tree graph analysis result management table, which is used to manage the processing modules that need to generate the time control information at the time different from the time of the reception of the primary information;

a second procedure of determining whether or not the processing module is a processing module that performs, on the primary information, jumping window operation in which a processing target range indicated by a time interval that is specified in the query is cut out, and registering, when the processing module is determined as the processing module that performs the jumping window operation, the processing module and the time interval in the query execution tree graph analysis result management table;

a third procedure of determining whether or not the processing module is a processing module that outputs a query processing result with a delay, and registering, when the processing module is determined as the processing module that outputs the query processing result with the delay, the processing module and a delay size in the query execution tree graph analysis result management table;

a fourth procedure of determining whether or not the processing module is a processing module that outputs a group of the query processing results at regular intervals, and registering, when the processing module is determined as the processing module that outputs the group of the query processing results, the processing module and an output interval in the query execution tree graph analysis result management table; and a fifth procedure of determining whether or not the processing module is a processing module with a function of excluding, from the query processing results, a processing result that has zero as a length of time in which the processing result remains the processing target, and registering, when the processing module is determined as the processing module with the function of excluding the processing result that has zero, the processing module and a minimum time unit in the query execution tree graph analysis result management table, and wherein at least one of the first procedure to the fifth procedure is repeated for every processing module in a query execution tree that is created from the registered query.

6. The machine-readable medium for storing a stream data processing program according to claim 5, wherein the procedure of calculating, by the time control information generation module for generating, as the time control information, the time information at the time of the reception of the primary information, the time at which the time control information is generated as the next ignition time, and storing the next ignition time in the next ignition time holding area, which is set in the storage system, comprises the procedures of:

determining whether or not the processing module is the processing module that performs, on the primary information, the sliding window operation in which the processing target range indicated by the time window that is specified in the query is cut out, and registering, when the processing module is determined as the processing module that performs the sliding window operation, in the next ignition time holding area, a value that is obtained by adding input time information and the time size together, the time size being registered in the query execution tree graph analysis result management table;

determining whether or not the processing module is the processing module that performs, on the primary information, the jumping window operation in which the processing target range indicated by the time interval that is specified in the query is cut out, and registering, when the processing module is determined as the processing module that performs the jumping window operation, a value that is obtained by adding time information and the time interval together, the time information indicating a time when the processing module has executed processing, the time interval being registered in the query execution tree graph analysis result management table;

determining whether or not the processing module is the processing module that outputs the query processing result with the delay, and registering, when the processing module is determined as the processing module that outputs the query processing result with the delay, in the next ignition time holding area, a value that is obtained by adding the input time information and the delay size together, the delay size being registered in the query execution tree graph analysis result management table;

determining whether or not the processing module is the processing module that outputs the group of the query processing results at the regular intervals, and registering, when the processing module is determined as the processing module that outputs the group of the query processing results, a value that is obtained by adding the time information and the output interval together, the time information indicating the time when the processing module has executed the processing, the output interval being registered in the query execution tree graph analysis result management table; and determining whether or not the processing module is the processing module with the function of excluding, from the query processing results, the processing result that has zero as the length of time in which the processing result remains the processing target, and registering, when the processing module is determined as the processing module with the function of excluding the processing result that has zero, in the next ignition time holding area, a value that is obtained by adding the input time information and the minimum time unit together, the minimum time unit being registered in the query execution tree graph analysis result management table.

7. The machine-readable medium for storing a stream data processing program according to claim 5, wherein the procedure of calculating, by the time control information generation module for generating, as the time control information, the time information at the time of the reception of the primary information, the time at which the time control information is generated as the next ignition time, and storing the next ignition time in the next ignition time holding area, which is set in the storage system, comprises the procedures of:

determining for every time control information generation module whether or not the time control information generation module has a parent-child relation in a graph structure that is a tree structure with the extracted processing module; and storing, when it is determined that the time control information generation module has the parent-child relation, the next ignition time in the next ignition time holding area.

8. The machine-readable medium for storing a stream data processing program according to claim 2, the computer further comprises:
a first computer; and
a second computer, the first computer generating the stream data, which is received as the primary information, attaching the time information that is generated in the first computer to the primary information, and transmitting the primary information to the second computer, the second computer executing processing of creating the secondary information by obtaining the given period of the received primary information as the processing target, the first computer transmitting the time control information indicating the advance of the time to the second computer in addition to the primary information, wherein the stream data processing program further controls the second computer to execute the procedures of:

extracting from the query the processing module that needs to generate the time control information at the time different from the time of the reception of the primary information, the query defining the processing specifics for creating the secondary information by obtaining the primary information; and calculating the next ignition time based on the extracted processing module and based on the time information at the time of the reception of the primary information, and transmitting the next ignition time as a next ignition time message to the first computer, the next ignition time being the time at which the time control information generation module for generating the time control information generates the time control information, and wherein the stream data processing program further controls the first computer to execute the procedures of:

receiving the next ignition time and storing the received next ignition time in the next ignition time holding area, where the next ignition time is held; and transmitting the time control information from the time control information generation module to the second computer at the next ignition time held in the next ignition time holding area.

9. The machine-readable medium for storing a stream data processing program according to claim 8, wherein the procedure of transmitting, by the first computer, the time control information from the time control information generation module to the second computer at the next ignition time held in the next ignition time holding area comprises the procedures of:

obtaining a current time from a system timestamp holding area, which holds a current time of the first computer;

obtaining the next ignition time held in the next ignition time holding area;

determining whether or not the obtained current time is equal to or larger than the next ignition time;

generating, when the obtained current time is equal to or larger than the next ignition time, the time control information at the next ignition time; and deleting, when an obtained final data input time is equal to or larger than the next ignition time, the next ignition time from the next ignition time holding area.

10. The machine-readable medium for storing a stream data processing program according to claim 8, wherein the procedure of extracting, by the second computer, from the query the processing module that needs to generate the time control information at the time different from the time of the reception of the primary information, the query defining the processing specifics for creating the secondary information by obtaining the primary information comprises:

a sixth procedure of determining whether or not the processing module is a processing module that performs, on the primary information, sliding window operation in which a processing target range indicated by a time window that is specified in the query is cut out, and registering, when the processing module is determined as the processing module that performs the sliding window operation, the processing module and a time size in a query execution tree graph analysis result management table, which is used to manage the processing modules that need to generate the time control information at the time different from the time of the reception of the primary information;

a seventh procedure of determining whether or not the processing module is a processing module that performs, on the primary information, jumping window operation in which a processing target range indicated by a time interval that is specified in the query is cut out, and registering, when the processing module is determined as the processing module that performs the jumping window operation, the processing module and the time interval in the query execution tree graph analysis result management table;

an eighth procedure of determining whether or not the processing module is a processing module that outputs a query processing result with a delay, and registering, when the processing module is determined as the processing module that outputs the query processing result with the delay, the processing module and a delay size in the query execution tree graph analysis result management table;

a ninth procedure of determining whether or not the processing module is a processing module that outputs a group of the query processing results at regular intervals, and registering, when the processing module is determined as the processing module that outputs the group of the query processing results, the processing module and an output interval in the query execution tree graph analysis result management table; and a tenth procedure of determining whether or not the processing module is a processing module with a function of excluding, from the query processing results, a processing result that has zero as a length of time in which the processing result remains the processing target, and registering, when the processing module is determined as the processing module with the function of excluding the processing result that has zero, the processing module and a minimum time unit in the query execution tree graph analysis result management table, and wherein at least one of the sixth procedure to the tenth procedure is repeated for every processing module in a query execution tree that is created from the registered query.

11. The machine-readable medium for storing a stream data processing program according to claim 10, wherein the procedure of receiving, by the first computer, the next ignition time and storing the received next ignition time in the next ignition time holding area, where the next ignition time is held comprises the procedures of:

determining whether or not the processing module is the processing module that performs, on the primary information, the sliding window operation in which the processing target range indicated by the time window that is specified in the query is cut out, and registering, when the processing module is determined as the processing module that performs the sliding window operation, in the next ignition time holding area, a value that is obtained by adding input time information and the time size together, the time size being registered in the query execution tree graph analysis result management table;

determining whether or not the processing module is the processing module that performs, on the primary information, the jumping window operation in which the processing target range indicated by the time interval that is specified in the query is cut out, and registering, when the processing module is determined as the processing module that performs the jumping window operation, a value that is obtained by adding time information and the time interval together, the time information indicating a time when the processing module has executed processing, the time interval being registered in the query execution tree graph analysis result management table;

determining whether or not the processing module is the processing module that outputs the query processing result with the delay, and registering, when the processing module is determined as the processing module that outputs the query processing result with the delay, in the next ignition time holding area, a value that is obtained by adding the input time information and the delay size together, the delay size being registered in the query execution tree graph analysis result management table;

determining whether or not the processing module is the processing module that outputs the group of the query processing results at the regular intervals, and registering, when the processing module is determined as the processing module that outputs the group of the query processing results, a value that is obtained by adding the time information and the output interval together, the time information indicating the time when the processing module has executed the processing, the output interval being registered in the query execution tree graph analysis result management table; and determining whether or not the processing module is the processing module with the function of excluding, from the query processing results, the processing result that has zero as the length of time in which the processing result remains the processing target, and registering, when the processing module is determined as the processing module with the function of excluding the processing result that has zero, in the next ignition time holding area, a value that is obtained by adding the input time information and the minimum time unit together, the minimum time unit being registered in the query execution tree graph analysis result management table.

12. A computer system, comprising:
a processor;
a storage system; and
an interface,
the computer system obtaining, as primary information, stream data which is set in the storage system and input via the interface, creating secondary information by obtaining a given period of the obtained primary information, and generating time control information indicating advance of time in addition to the primary information, the computer system further comprising:
a query execution tree analyzing module for extracting from a query a processing module that needs to generate the time control information at a time different from a time of reception of the primary information, the query indicating processing specifics for creating the secondary information by obtaining the primary information;
a next ignition time calculating module for calculating an ignition time from based on extracted processing module and based on time information at the time of the reception of the primary information, and storing the ignition time in a next ignition time holding area, which is set in the storage system, the ignition time being a time at which a time control information generation module for generating the time control information generates the time control information; and
a time control information generation module for generating, as the time control information, the time information at the time of the reception of the primary information,
wherein the time control information generation module generates the time control information when current time information reaches the ignition time held in the next ignition time holding area.

13. A computer system, comprising:
a first computer; and
a second computer, the first computer generating stream data, which is received as primary information, attaching time information that is generated in the first computer to the primary information, and transmitting the primary information to the second computer, the second computer creating secondary information by obtaining a given period of the received primary information, the first computer transmitting time control information indicating advance of time to the second computer in addition to the primary information, the computer system further comprising:

a query execution tree analyzing module of the second computer, for extracting from a query a processing module that needs to generate the time control information at a time different from a time of reception of the primary information, the query indicating processing specifics for creating the secondary information by obtaining the primary information;

a next ignition time calculating module of the second computer, for calculating an ignition time based on the extracted processing module and based on time information at the time of the reception of the primary information, and transmitting the ignition time to the first computer, the ignition time being a time at which a time control information generation module for generating the time control information generates the time control information;

a next ignition time message receiving module of the first computer, for receiving the ignition time and storing the received ignition time in a next ignition time holding area, where the ignition time is held; and a time control information generation module of the first computer, for transmitting the time control information to the second computer at the ignition time held in the next ignition time holding area.

* * * * *